United States Patent [19]

Belleson et al.

[11] 4,300,206
[45] Nov. 10, 1981

[54] FLEXIBLE TEXT AND IMAGE GENERATOR FOR A RASTER PRINTER

[75] Inventors: James G. Belleson, Hillsborough; John R. Disbrow; Everett T. Eiselen, both of Los Gatos, all of Calif.

[73] Assignee: International Business Machines Corporation, Armonk, N.Y.

[21] Appl. No.: 10,276

[22] Filed: Feb. 7, 1979

Related U.S. Application Data

[63] Continuation of Ser. No. 811,911, Jun. 30, 1977, abandoned.

[51] Int. Cl.[3] .............................................. G06F 3/12
[52] U.S. Cl. .................................................... 364/900
[58] Field of Search ... 364/900 MS File, 200 MS File; 400/61-65, 70, 72, 76; 340/731, 750, 798-800; 101/93.04, 93.05; 178/30

[56] References Cited

U.S. PATENT DOCUMENTS

| | | | |
|---|---|---|---|
| 3,634,828 | 1/1972 | Myers et al. ........................ | 364/200 |
| 3,898,627 | 8/1975 | Hooker et al. ...................... | 364/900 |
| 3,959,776 | 5/1976 | Morley ................................ | 364/900 |
| 3,959,780 | 5/1976 | Kashio ................................ | 364/900 |
| 3,964,591 | 6/1976 | Hill et al. .......................... | 400/72 X |
| 3,970,183 | 7/1976 | Robinson et al. ................. | 400/65 X |
| 3,999,168 | 12/1976 | Findley et al. ...................... | 364/900 |
| 4,000,486 | 12/1976 | Schomburg ......................... | 364/200 |
| 4,007,442 | 2/1977 | Findley et al. ..................... | 364/900 |
| 4,059,833 | 11/1977 | Kitamura et al. ............... | 364/900 X |
| 4,107,786 | 8/1978 | Masaki et al. ....................... | 364/900 |

*Primary Examiner*—Raulfe B. Zache
*Attorney, Agent, or Firm*—Otto Schmid, Jr.

[57] ABSTRACT

A raster printer with sufficient flexibility so that text data and image data of any size and orientation can be placed at any position on a page. Input data has a succession of coded character data along with control data which specifies information concerning font selection and the placement of the characters on the page. Control circuits process the input data, one character at a time, and generate for each of the characters, data relating to the position of the character on the page, the size of the character and the address in storage of the graphic pattern for the character. The data is utilized by pattern move control logic to access the graphic pattern in the order the characters are to be printed and move the graphic data to a strip buffer. Data is read out of the strip buffer to energize imaging apparatus to print a page corresponding to the graphic pattern of the character data. An accumulator provides temporary storage for parts of the graphic pattern data and this data is logically ORed with later data so that a page of unlimited complexity can be printed.

22 Claims, 27 Drawing Figures

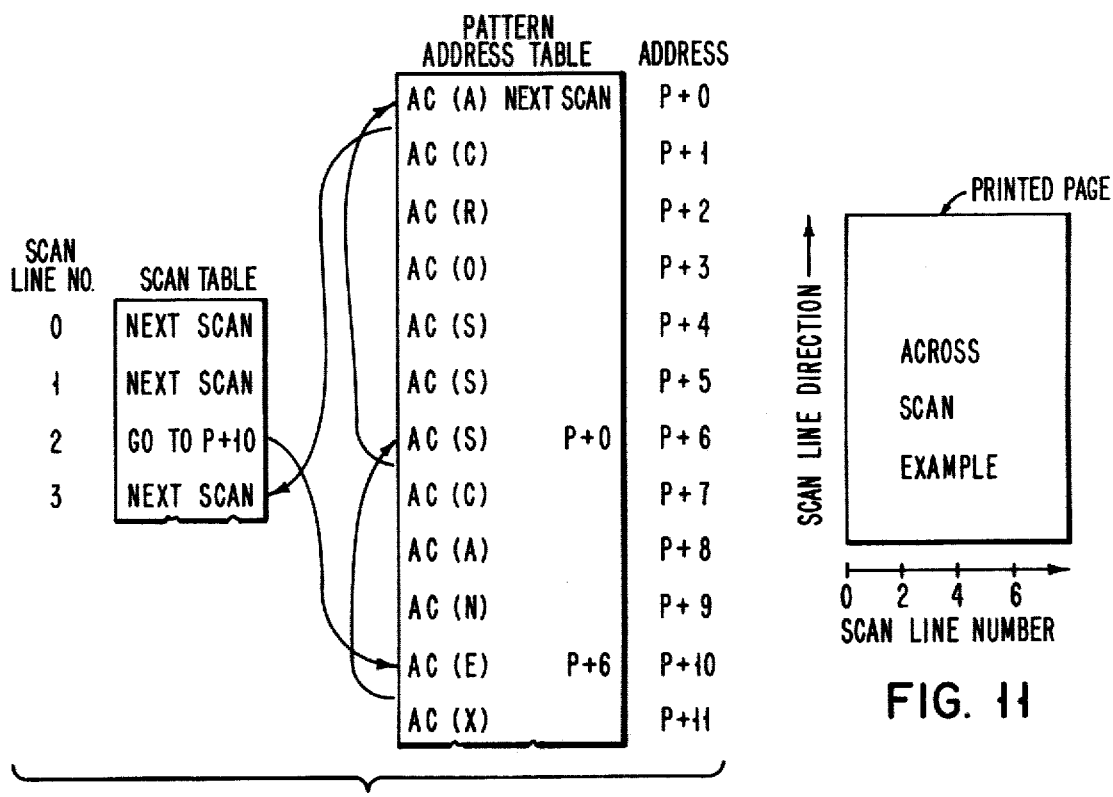
FIG. 10
FIG. 11
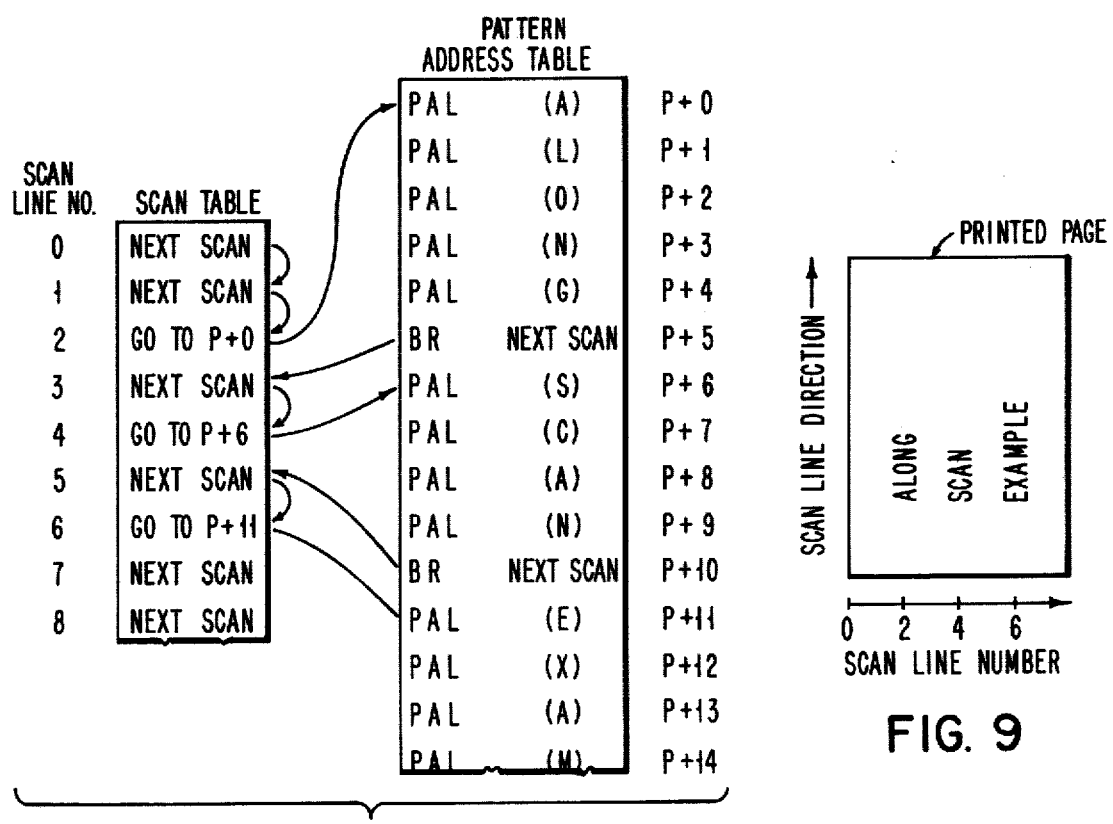
FIG. 8
FIG. 9

FIG. 15

|     |                           |
|-----|---------------------------|
| C1  | SYNCH BIT                 |
| C2  | STATUS                    |
| C3  | MODE – 16 BIT             |
| C4  | MODE – DD                 |
| C5  | SCAN = 0                  |
|     |                           |
| A1  | READ & LATCH RPM          |
| A2  | GATE 1                    |
| A3  | GATE 2                    |
| A4  | GATE 3                    |
| A5  | GATE 4                    |
| A6  | GATE 5                    |
| A7  | GATE 6                    |
| A8  | WRITE SB                  |
| A9  | INCR RPM ADDR             |
| A10 | INCR SB SCAN              |
| A11 | DECR SCAN                 |
| A12 | INCR STATUS COUNTER       |
| A13 | RESET STATUS COUNTER = 0  |
| A14 | RESET SYNC                |

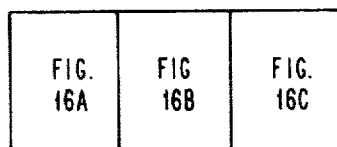
FIG. 16
FIG. 16C
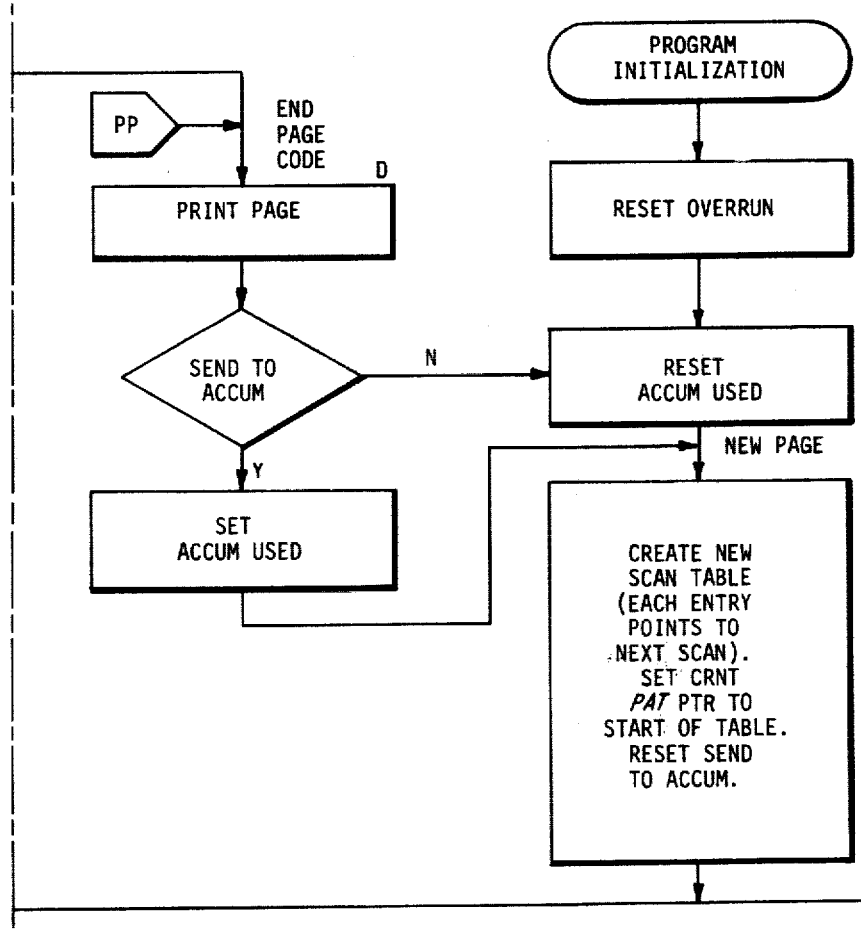

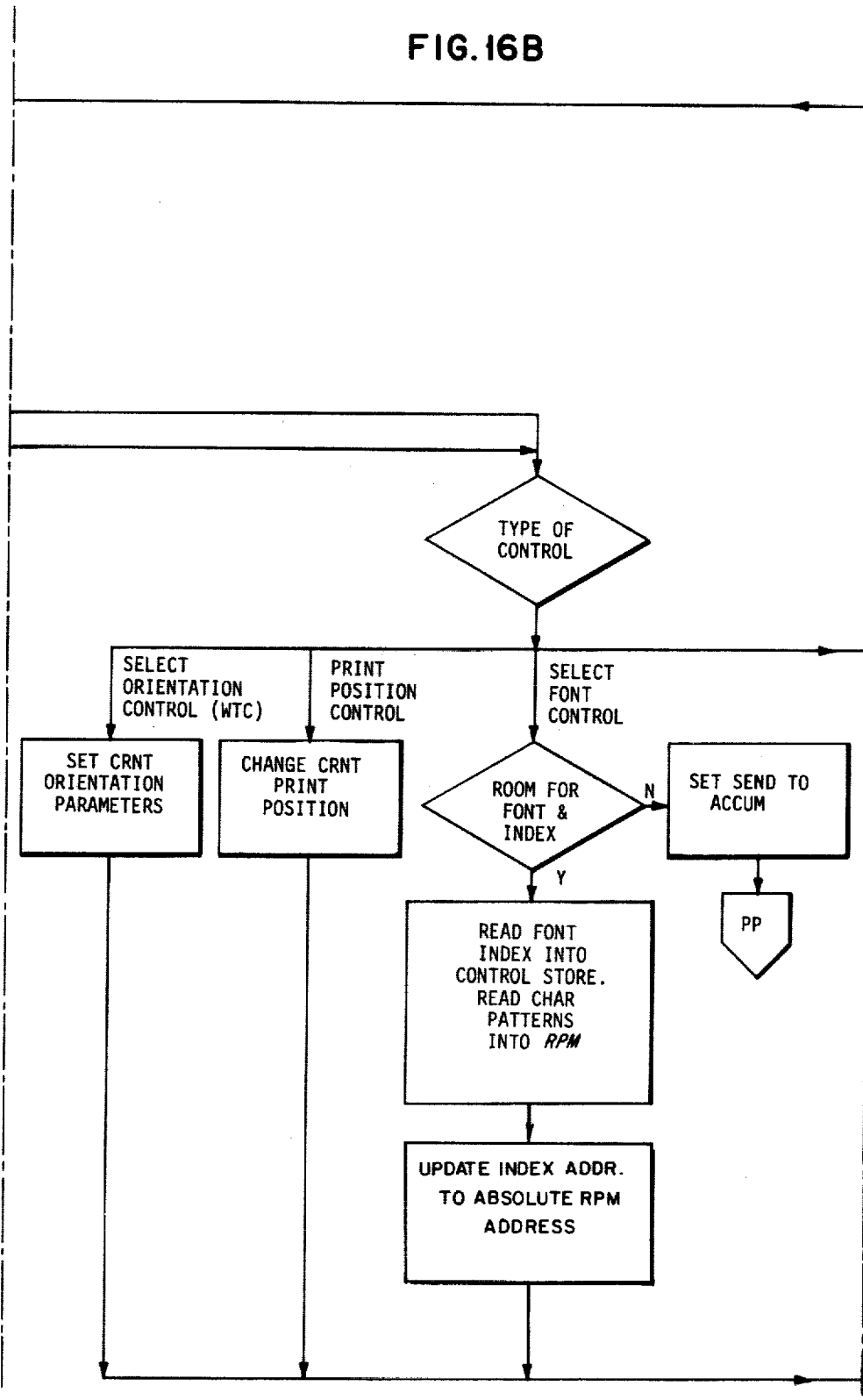

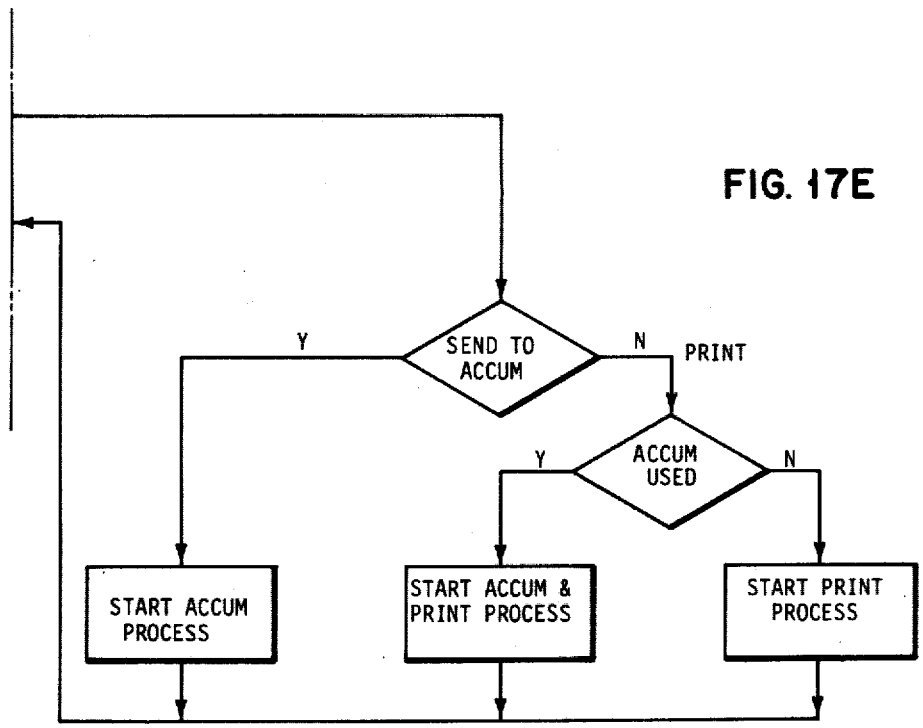

FIG. 17E

NOTE: DURING PRINT, AS EACH SCAN IS PRINTED, THE PRINTING SCAN IS INCREMENTED. IF ACCUMULATOR IS USED, READING FROM THE ACCUMULATOR IS SYNCHRONOUS WITH READING FROM THE STRIP BUFFER.

DURING ACCUMULATION, AS EACH SCANLINE IS LOADED, THE PRINTING SCAN IS INCREMENTED. IF PRINTING SCAN IS < THE STRIP BUFFER SCAN, THEN THE NEXT SCAN IS SENT FROM THE STRIP BUFFER TO THE ACCUMULATOR.

FLEXIBLE TEXT AND IMAGE GENERATOR FOR A RASTER PRINTER

CROSS-REFERENCES TO RELATED APPLICATIONS

This is a continuation of application Ser. No. 811,911, filed June 30, 1977, now abandoned.

BACKGROUND OF THE INVENTION

The present invention relates to raster printers of the type which print text and image data in response to coded digital input data and more particularly to such printers which have the ability of place variable sized characters anywhere on a printed page, irrespective of the order in which the characters are received at the printer.

Printers of the type which print graphic characters in response to coded character data in binary form have found widespread use in many data processing operations and systems. Such printers respond to the incoming coded character data to physically print the graphic characters represented by the character data as defined by the code thereof. The printing operation can assume various different forms including the well known impact printer in which the graphic character is produced by the selection of a piece of type which strikes the paper or other printable medium to produce the desired graphic character. There has also been in the prior art different non-impact printers in which the graphic character data is produced on the printable material by the deposition of some marking medium on the paper without physical impact of a piece of type or other similar device.

Prior art printers of the type described suffer from a number of disadvantages which often limit their usefulness. One limitation of such printers relates to the limitation of the number of fonts they could produce and a restriction in their flexibility of placing characters on the printed page. For example, it has not been possible in prior art printers to print a sequence of characters that can proceed in any direction to place characters of any position on the page, or to select from a wide variety of character sizes at any time.

BRIEF DESCRIPTION OF THE INVENTION

The present invention provides for a raster printer with sufficient flexibility so that characters of any size can be placed at any position on the page comprising means for receiving input data in the form of a succession of coded character data with control data and processing the character data in response to the control data one at a time to translate the characters into data which defines the size of the graphic coded characters, the address in storage of the graphic coded pattern and the position on the page where the pattern is to be printed. The data is assembled in a strip buffer means, which has the capacity to store a part of a page. Second control means are operable in response to the position indicating group of data for accessing the character data from the raster pattern storage and moving it into the position in the strip buffer means defined by the location specifying part of the data. The data is removed from the strip buffer means and coupled to a raster imaging device to print the graphic data represented by the input data.

BRIEF DESCRIPTION OF THE DRAWINGS

FIG. 8 shows a diagram of a specific embodiment of the sorting arrangement for printing text data along the scan line direction;

FIG. 9 is a diagram of a page printed along the scan line direction;

FIG. 10 shows a diagram of the specific embodiment of the arrangement for sorting the characters for printing text data across the scan line direction.

FIG. 11 is a diagram of a page printed across the scan line direction;

FIG. 15 is a decision table for the pattern move control logic 44;

FIG. 16 comprises an organizational diagram for FIG. 16A through 16C.

FIGS. 16A through 16C comprise a flowchart for the microprocessor program that prepares a page for printing;

FIGS. 17A through 17F comprise a flowchart for the microprocessor program that controls the printing of a page.

DETAILED DESCRIPTION OF THE PREFERRED EMBODIMENT

Figure 1:
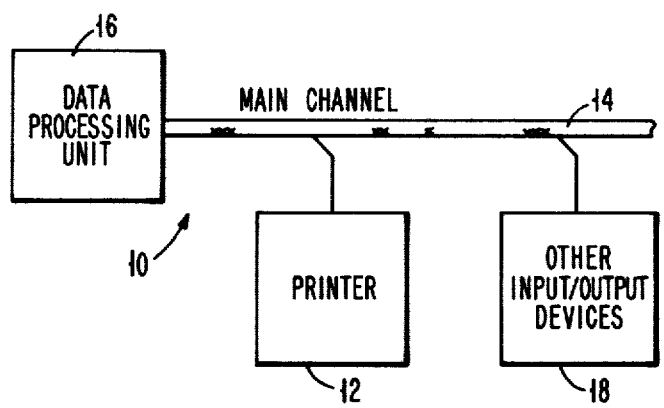
FIG. 1 is a basic block diagram showing the manner in which printers according to the invention are coupled to a data processing unit via a main channel.

FIG. 1 illustrates a data processing system 10 which includes a printer in accordance with the invention coupled to a main channel 14 of a data processing unit or computer 16. The printer 12 comprises an input/output device and the main channel 14 may be, and is typically, coupled to other input/output devices illustrated as 18 in FIG. 1.

The general operation of the data processing system 10 in conjunction with the printer 12 may be as described in IBM System/370 Principles of Operations, form GA 22-700, published by International Business Machines Corporation. As described in that publication, the data processing unit 16 which typically includes a central processing unit and a main store, communicates with a printer and other input/output devices 18 via the main channel 14. Character code bytes, each of which represents a different character or image to be printed by the printer 12, are originated in the data processing unit 16 and are communicated to the printer 12 under control of a channel command word sent to the main channel 14. Some control data is also included with the character data. Other channel command words originating in the data processing unit 16 include certain operation constants used in the printer 12 and certain instructions for the operation of the printer 12.

Figure 2:
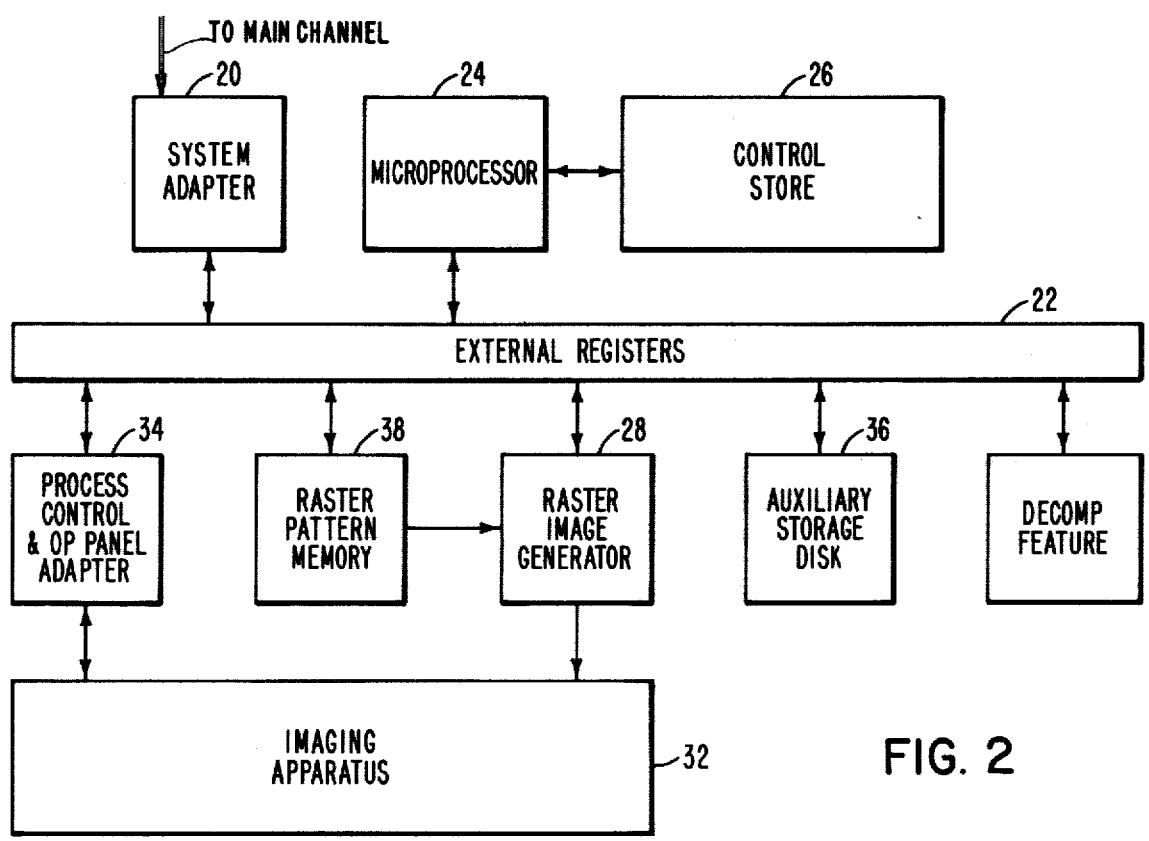
FIG. 2 is a block diagram of the basic components comprising the printer shown in FIG. 1.

FIG. 2 shows the basic arrangement of the printer 12 of FIG. 1 according to the invention. The printer 12 includes a system adapter 20 which is coupled to the main channel 14 via a channel attachment providing appropriate interface between the main channel 14 and the printer 12. Data from the data processing unit 16 is communicated over the main channel to the channel attachment where it is carried by the external registers 22 to microprocessor 24 on its way from the channel to the control store 26. The microprocessor 24 may assume any appropriate configuration such as shown, for example, in U.S. Pat. No. 4,031,519, Findley, entitled "PRINTER" issued June 21, 1977. The printer can handle a data record from the channel of up to 2,048 bytes of data. The external registers 22 also provide data to the raster pattern memory 38, the raster image generator 28 and to imaging apparatus 32 by means of the process control adapter 34.

The imaging apparatus 32 in a preferred embodiment comprises apparatus responsive to a modulated laser scan for coating toner on the areas of a print drum discharged by the laser and transferring the toner onto paper. An example of imaging apparatus 32 which may be used is shown in U.S. Pat. No. 3,750,189, Fleischer, entitled "LIGHT SCANNING AND PRINTING SYSTEM" issued July 31, 1973. The imaging apparatus may comprise any appropriate raster printer apparatus which prints the desired character graphics in response to the character data.

The microprocessor 24 stores the data from the data processing unit and executes the instructions provided by the various micro routines of microprograms loaded by the printer's user from a disk storage device 36. The printer is controlled by the microprocessor by the use of the external registers as the interface for controlling the devices associated with it, and these devices include the attachment 20 to the host system. It will be recognized by those skilled in the art that the printer could also be controlled by hard wired logic circuits. The process control adapter 34 is the interface to the imaging apparatus, and the microprocessor controls the printing through this interface. The adapter 34 provides control of the paper, signals for starting of the printing process and it alerts the microprocessor relative to the status signals from the imaging apparatus. In addition, the adapter transfers to the microprocessor signals representing all actions that occur at the operator's panel and passes back to the adapter signals to control the appropriate lights on the control panel.

Figure 16A:
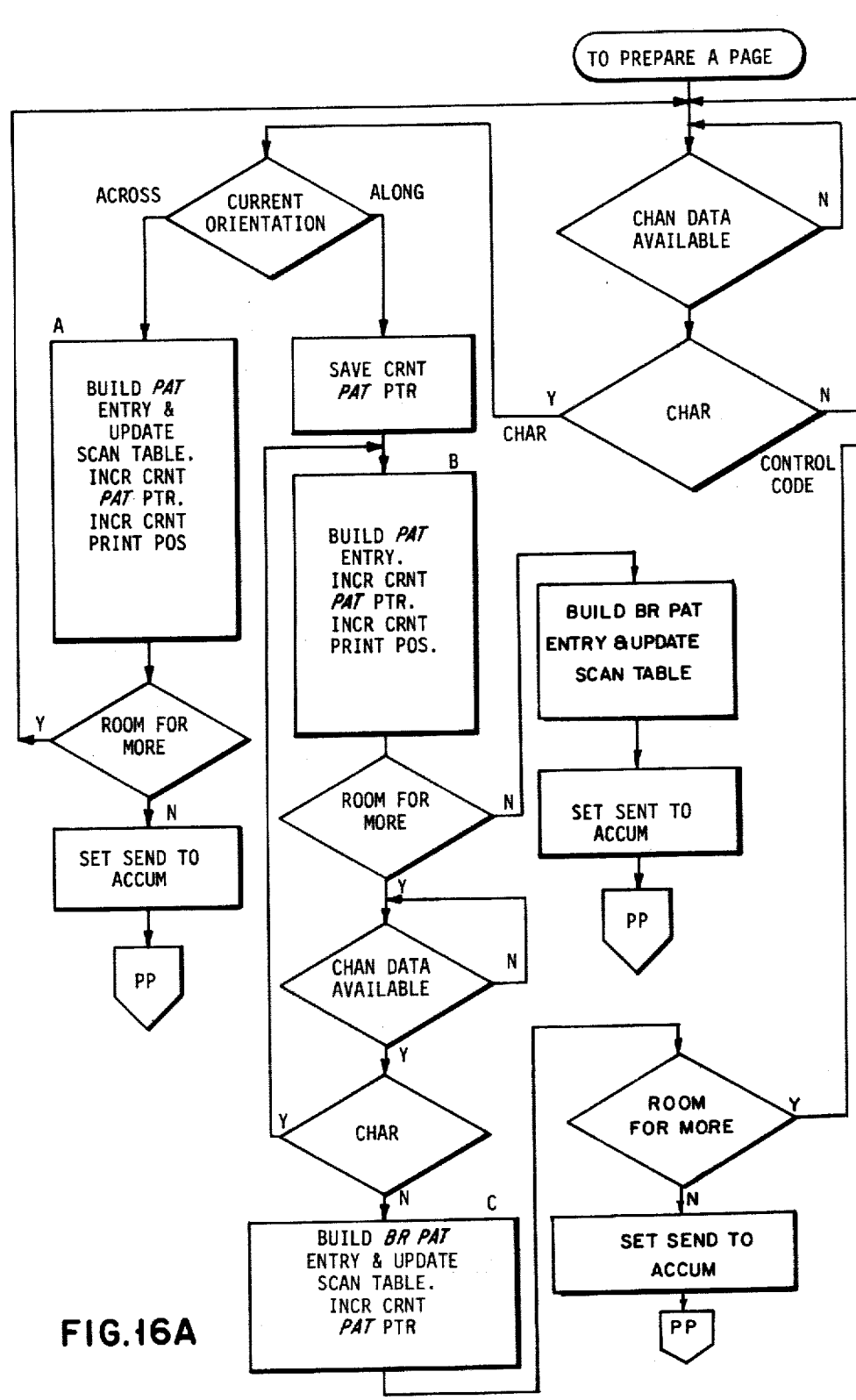
Figure 17D:
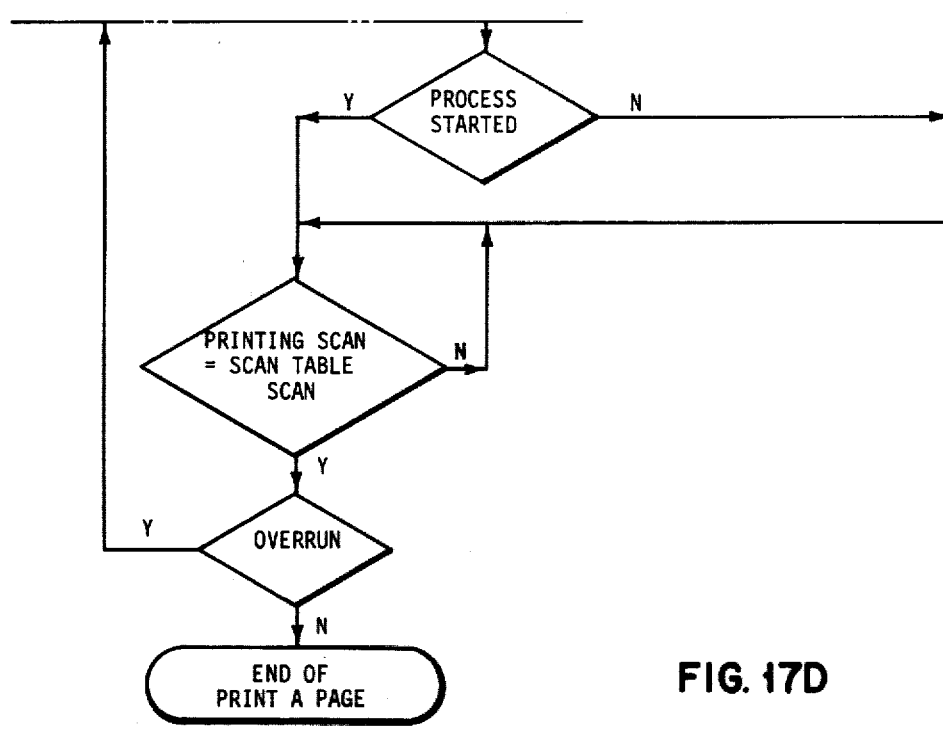
Figure 17:
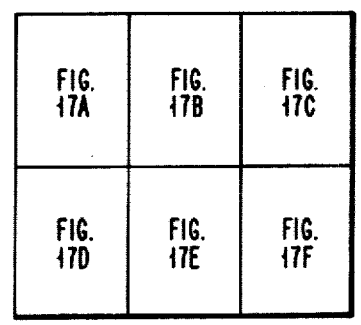
FIG. 17 comprises an organizational diagram for FIGS. 17A through 17F.
Figure 17A:
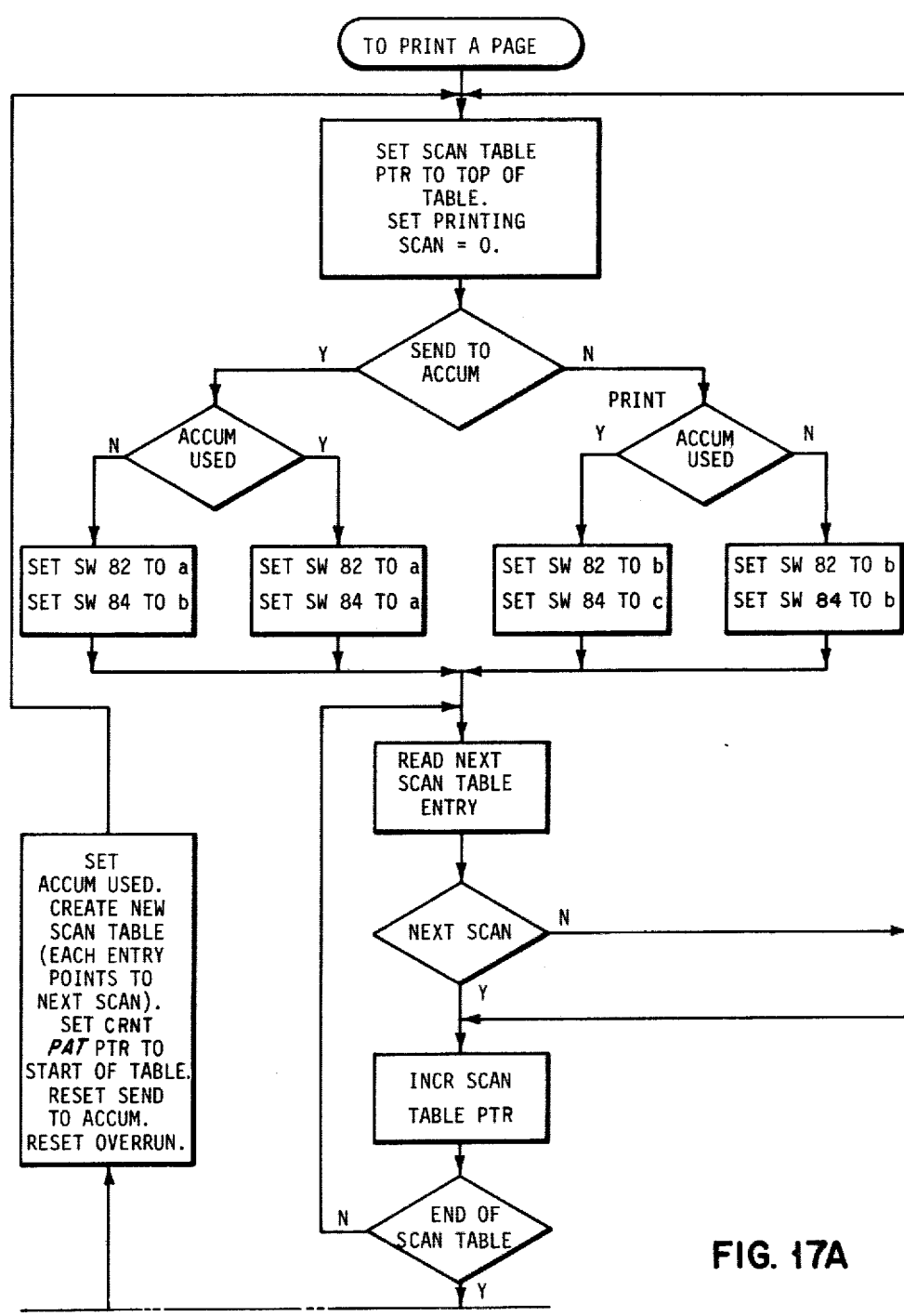
Figure 17B:
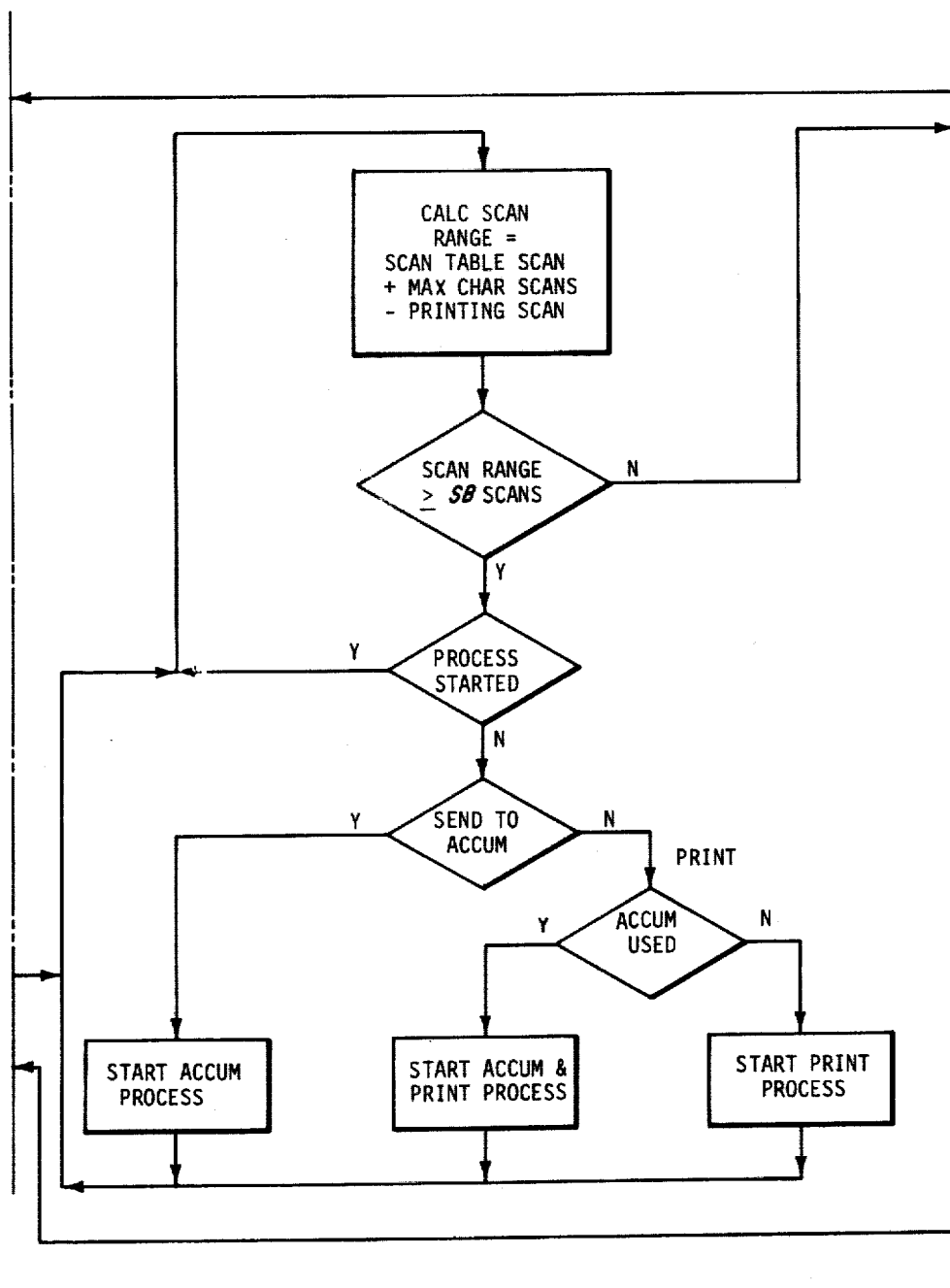
Figure 17C:
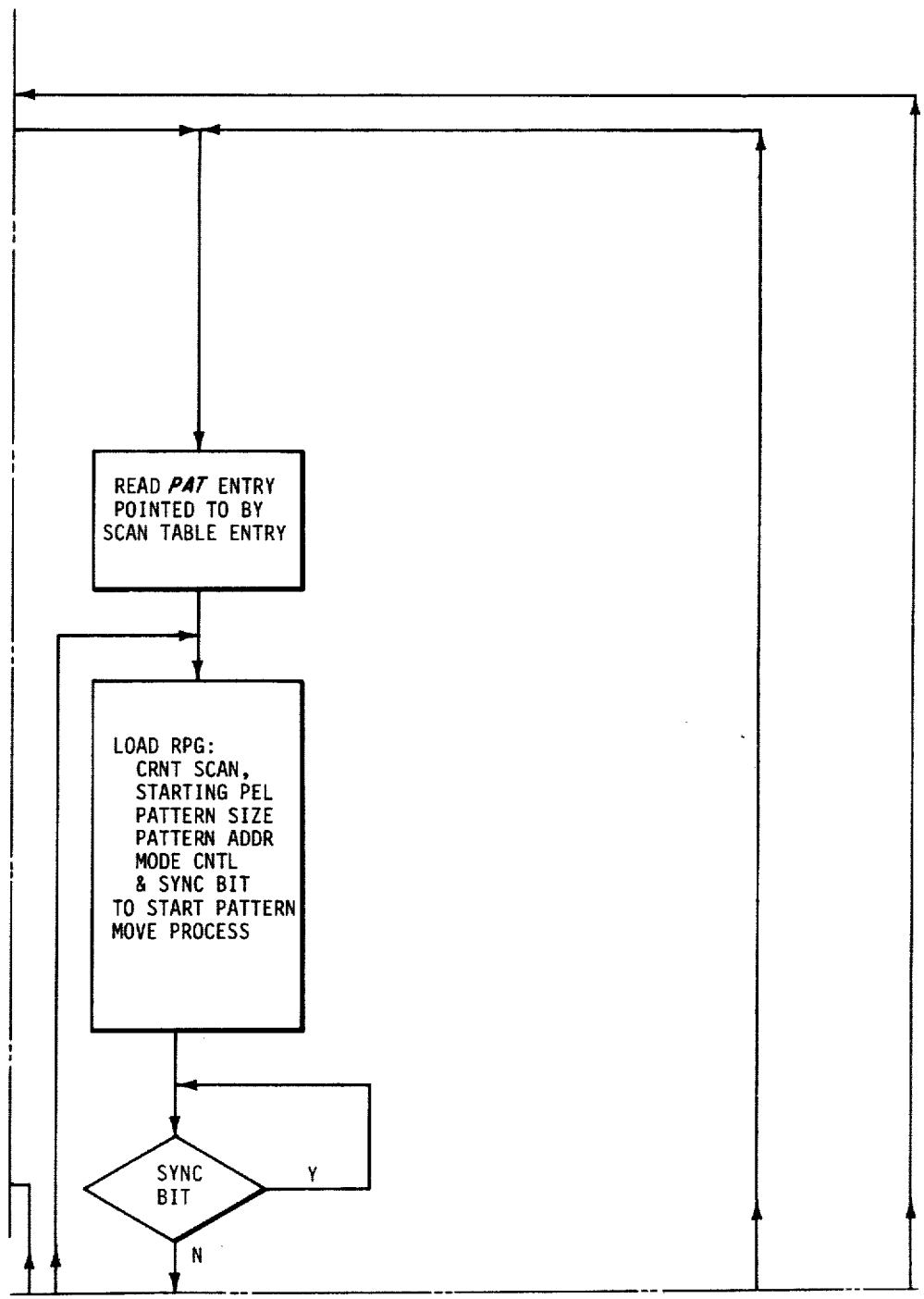
Figure 17F:
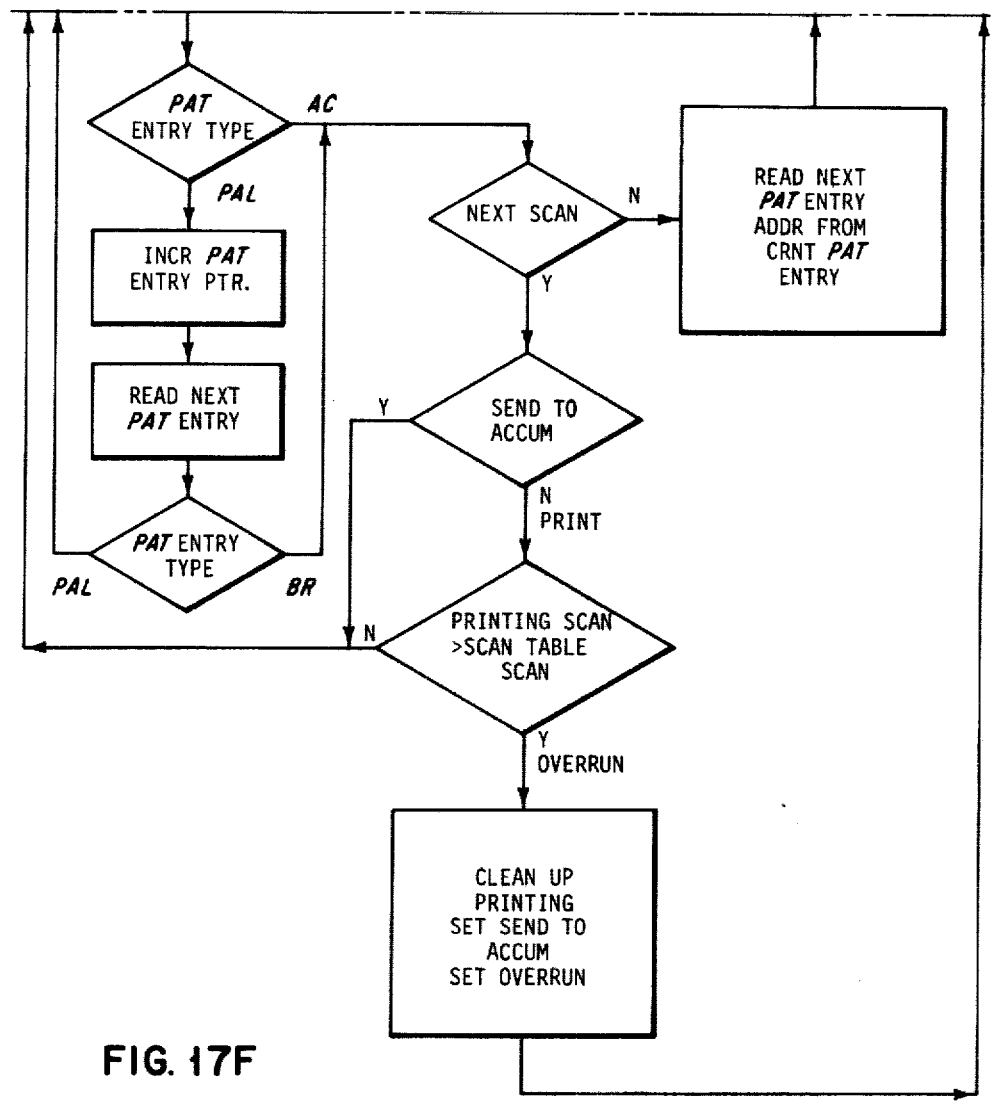

The raster image generator 28 creates the page being printed. The microprocessor interprets the controls passed from the host system and prepares the page for printing, as shown in the flow chart of FIGS. 16A through 16C, when organized as shown in FIG. 16. The microprocessor then takes an active part in the process of printing the page, as shown in the flow chart of FIGS. 17A through 17F, when organized as shown in FIG. 17. The character patterns used during printing are held in the raster pattern memory (RPM) 38 which must have been loaded by the microprocessor before printing can take place. The auxiliary storage device 36 is used for the initial microprogram load operation and also for storage of diagnostics programs and error logs, and it may also contain fonts which are loaded into the RPM for printing. The microprocessor controls all seeks and data flow in the auxiliary storage device.

Figure 4:
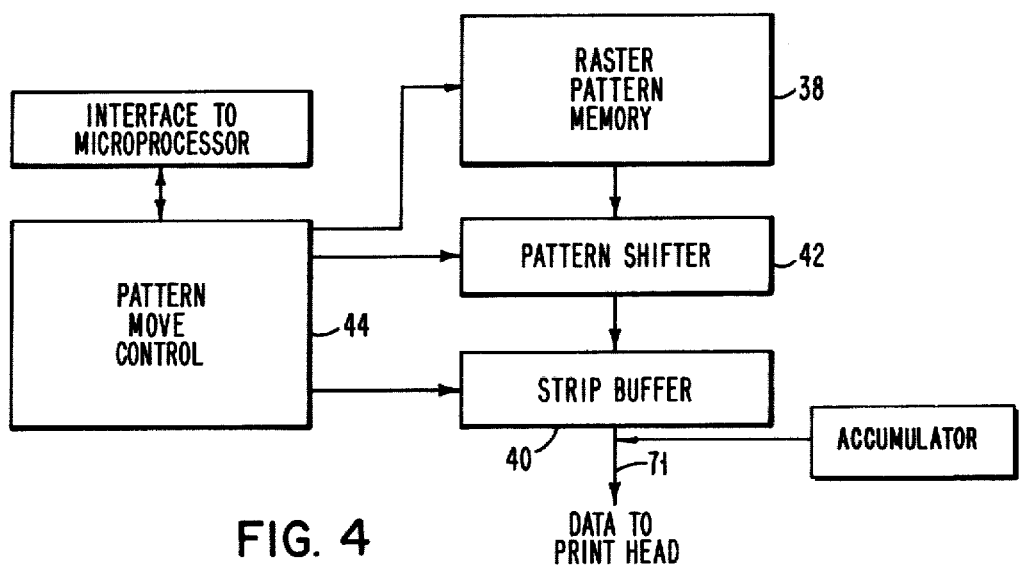
FIG. 4 is a block diagram of the basic components comprising the raster image generator of FIG. 2.

The way in which the raster image generator 28 creates the page to be printed can be understood by referring to FIG. 4. The microprocessor controls the raster image generator through a set of the external registers. After the microprocessor has loaded all the control parameters, it sets a synchronization bit that permits the pattern moving process to begin. After a pattern has been moved, the raster image generator alerts the microprocessor so that the parameter registers can be reloaded. The data available from the microprocessor includes the starting scan and the starting pel parameters; the scans per pattern and the pels per scan give the size of the pattern. The pattern address tells where the pattern to be placed on the page can be found in the raster pattern memory 38. The synchronization control keeps the microprocessor program and the pattern moving process in step with each other.

There are five major elements in the raster image generator as shown in FIG. 4. The raster pattern memory 38 holds the raster patterns that are to be placed on the page. It contains character patterns, raster image fields and patterns used for generating rules or lines. The user can view the printer as providing a full page raster buffer into which the page is created. In reality, the raster image generator has a buffer that covers only a small fraction of the page. The page is created in this strip buffer 40, and at the same time, sent to the imaging apparatus or to the accumulator means 90. The pattern shifter 42 properly positions each scan line of pattern along the scan relative to the word structure of the strip buffer. An example of a pattern shifter 42 which may be used is provided in IBM Technical Disclosure Bulletin, Vol. 19, No. 12, May, 1977, pages 4763-6, SHIFTER RESIDUE CHECKER, L. W. Pereira. The pattern move control 44 causes the transfer of the pattern from the raster pattern memory 38 through the pattern shifter 42 and into the strip buffer 40. The data is then printed from the strip buffer.

Figure 3:
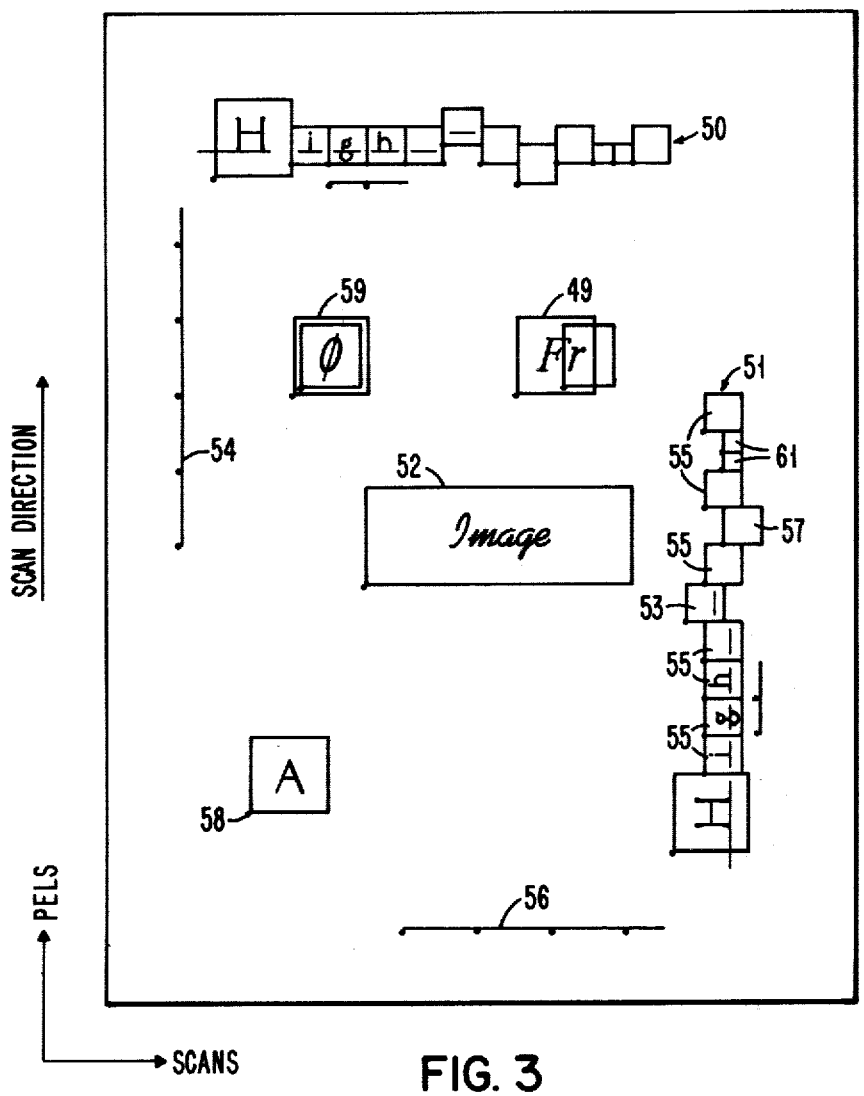
FIG. 3 is a diagram showing the printing flexibility of the printer according to the invention.

Thus, the printer is capable of printing a page with a very flexible format. A page layout showing the variety of formats is shown in FIG. 3. For example, a line of data 50 at the top of the page is printed across the scan direction, whereas this same line of printing 51 is shown printed along the scan direction. In addition to the text data, the printer is capable of printing raster image data at any place on the page, such as the image data 52 and line segment patterns that are used for drawing rules, such as vertical rule 54 or horizontal rule 56 can also be printed with this printer. The patterns are formed by a series of scans along the page, and successive scans are displaced so that the entire page can be printed by successive scans. The size of the characters is defined from a particular place such as the starting scan and starting pel which are located at the corner 58 of the "A" in FIG. 3. The dimension of the pattern along the scan direction is defined in terms of picture elements (pels), whereas orthogonal to the scan direction the dimension of the character is defined in terms of the number of scans. Character patterns can be either 32 or 16 pels per scan, and if the character requires more than 32 pels then it is made up of multiple subpatterns which are treated by the printer as multiple separate characters. Any pattern can have a maximum number of scan lines which is a limitation imposed by the size of the strip buffer. For example, for a strip buffer which has storage for 128 scan lines, the pattern can have a maximum of 64 scan lines, so that patterns are printed out of half of the strip buffer while patterns are being loaded into the second half of the strip buffer. Larger character patterns can be printed as multiple character patterns in response to a single character code sent over the channel.

Character patterns are stored in groups of related characters of the same size and style called a font. Fonts are stored in 2,048 byte blocks of storage and the patterns may not span the boundaries between 2,048 byte blocks. There is a font index associated with each font, and this index contains information that pertains to all the characters in the font, such as baseline offset, for example, and information that is unique to each character, for example, the size of the pattern, the address in the RPM where the pattern is stored, and how much to move the print position after this character. The microprogram which prepares the page for printing uses the index for converting from EBCDIC codes to pattern addresses and for the other controls required to build the page. The index consists of 256 entries, although only 254 codes can be used for printable patterns because one code is reserved for an escape to a control sequence and a second code is used for designating a blank. A font index is held in control store for each font that is active in the current page.

Raster images are broken down into square subarrays and these subarrays can then be handled by the hardware just like character patterns, and the normal image subarray is 32 pels by 32 scans. The patterns used for drawing rules are created in 32 by 32 squares, and the patterns are used for drawing both rules along the scans and rules across the scans. The first pattern has one black pel per scan line. Each subsequent pattern increases by one the number of black pels per scan. The last pattern has all 32 pels per scan black. A complete set of rule patterns consists of 32 patterns and requires 4,096 bytes of raster pattern memory storage.

Figure 6:
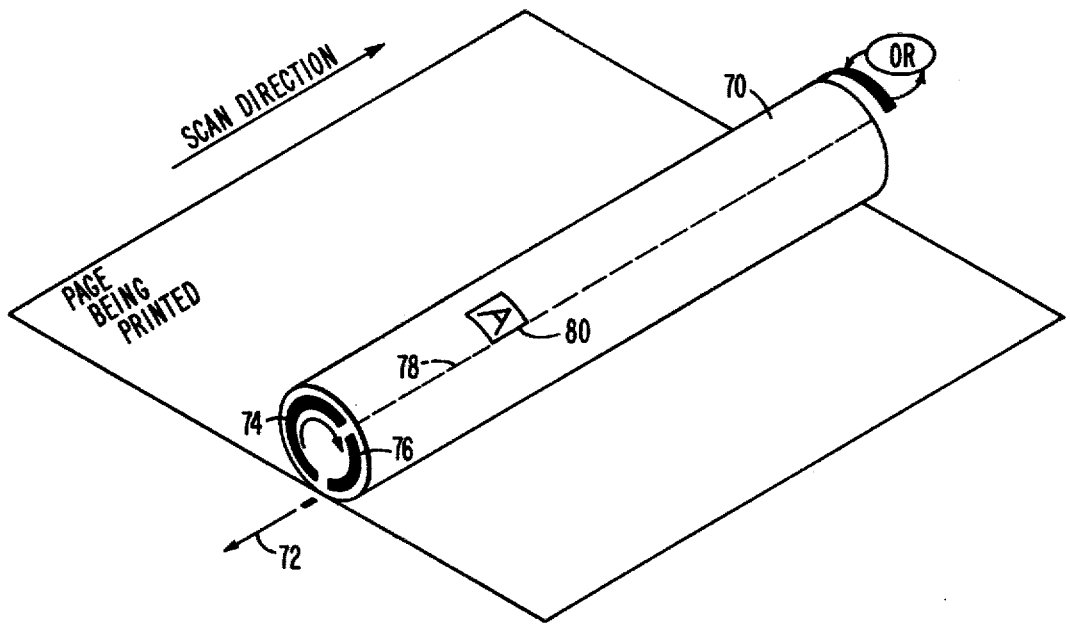
FIG. 6 is a diagram showing a conceptual operation of the strip buffer.

The raster image to be printed is created in the strip buffer. In the embodiment described, the strip buffer covers only a small fraction of the page, since it contains only 128 scan lines. Depending on the resolution, this strip buffer capacity would normally provide data for printing only a fraction of an inch of the page. The conceptual operation of the strip buffer is illustrated in FIG. 6 as a cylinder 70 where scan line 127 wraps back to scan line 0. The printing takes place from those scan lines 76 filled and ready for printing as the strip buffer rolls across the plane of the page being printed. The data on the scan line at the contact point is sent to the imaging apparatus. As each scan line is printed, the cylinder, in effect, rolls one scan line position. Since each scan line position in the strip buffer is used several times during the printing of the page, after sending data to the imaging apparatus, that position in the scan line is set to zero. The entire character patterns such as the A 80 are loaded into the scan lines 74 that have been cleared before printing. The loading process begins at the current starting scan line (depicted by dotted line 87) and moves into the cleared area 74 toward the place where data is being sent to the printer (as depicted by arrow 72). The current starting scan line 78 is prevented from moving closer than 64 scan lines from the printing scan so that the largest character pattern can be loaded without interfering with the printing process. If the distribution of the data on the page would cause the starting scan to move into the 64 scan work area, it must pause and wait for the printer to finish with enough scan lines so that the 64 scan line work area can be preserved. On the other hand, the printer must not be permitted to catch up to the starting scan. If the distribution of the data on the page would cause the printer to catch up with the starting scan, then an overrun condition would exist. Overrun must be avoided, because, in a synchronous printer such as an electrophotographic printer, it would result in a bad page being printed. Overrun can be avoided by sending the raster image to the accumulator means 90 before printing.

Figure 5:
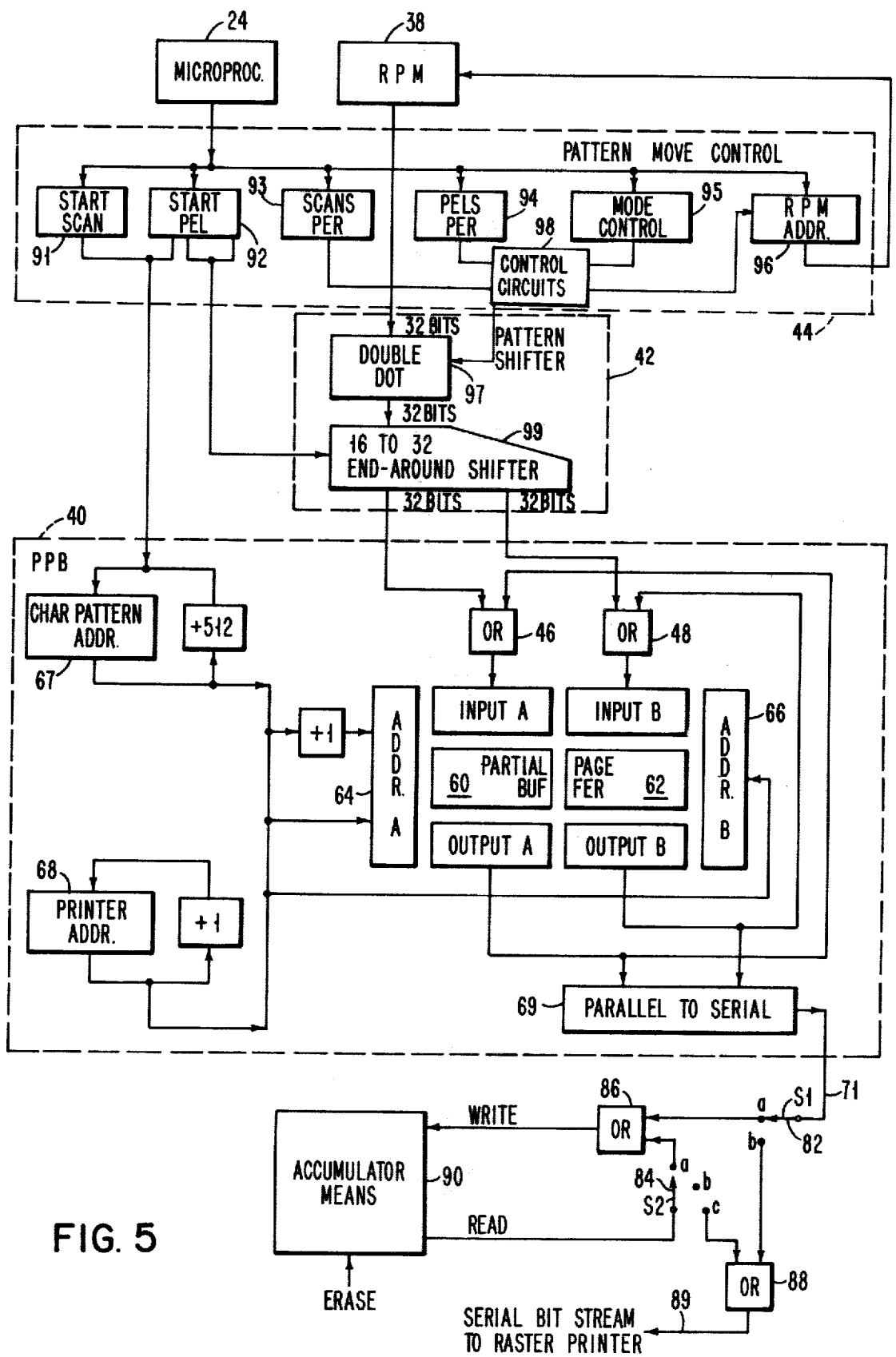
FIG. 5 is a block diagram of the data flow and control for the raster image generator for the printer.
Figure 13:
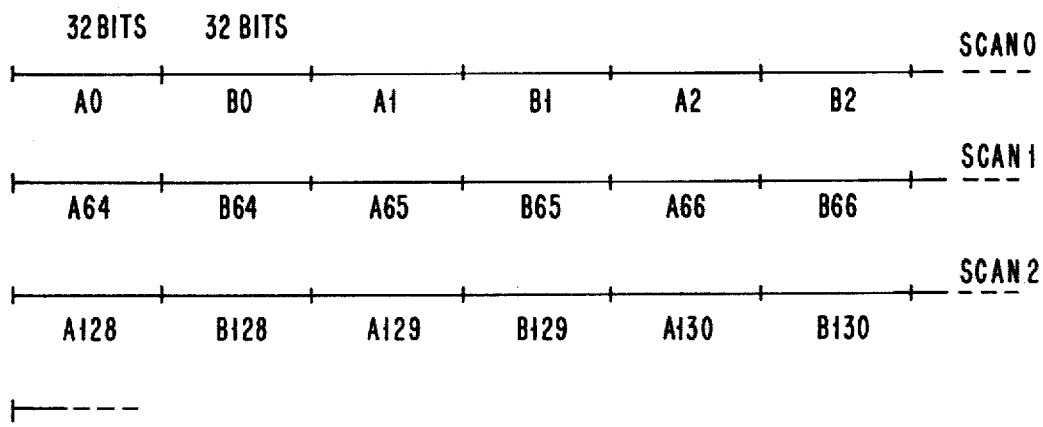
FIG. 13 is a diagram showing the layout of the scan line storage in the strip buffer.

The strip buffer accesses a pair of 32-bit words at a time. The pattern can have either 16 or 32 bits per scan and can be positioned to an arbitrary pel within a scan. The purpose of the pattern shifter is to properly position patterns with respect to the 32-bit word structure of the strip buffer. Before explaining the operation of the pattern shifter, it is necessary to understand the organization of the strip buffer. The strip buffer 40 is divided into two halves, each one word wide as shown in the specific embodiment of FIG. 5. The strip buffer can be implemented using standard memory techniques. For example, the 04 K×8 memory system illustrated in FIG. 27 on page 6-15 of the Memory Design Handbook published in 1977 by Intel Corporation can be used. In that case, each half of the strip buffer is made up of 8 memory boards. Four boards operating in parallel make up the scan lines 0 through 63 of the strip buffer, and the other four boards provide scan lines 64 through 127. Both section A 60 and B 62 are accessed each time the strip buffer is read or written, hence the input and output registers can be treated as single units. The two sections have separate, but coordinated, address registers 64, 66 where the address of Section A 64 is either equal to the address of section B 66 or is one greater than the address of Section B. The pels in a scan line are arranged into 32-bit words which alternate between Sections A and B of the strip buffer as shown in FIG. 13.

Figure 7A:
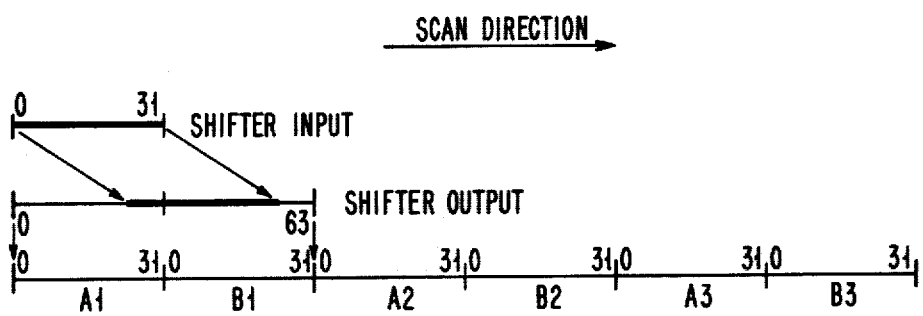
FIGS. 7A and 7B are diagrams illustrating the pattern shifter operation.
Figure 7B:
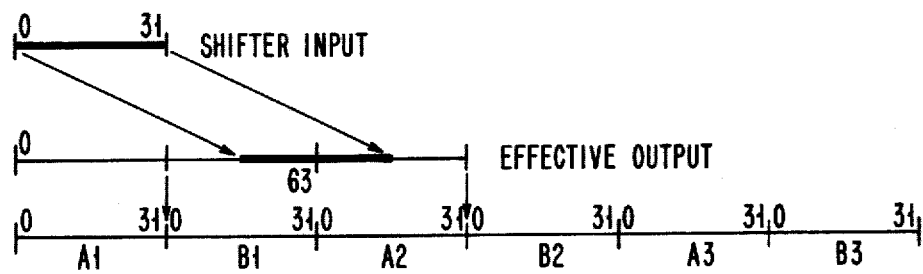

The input to the pattern shifter 42 is 32 bits wide and the output of the pattern shifter is 64 bits wide. In the specific example shown in FIG. 5, pattern shifter 42 includes an end around shifter 99. Pel zero of the input can be positioned to any of the 64 pel positions of the output as shown in the two cases illustrated in FIGS. 7A and 7B. The following 31 pels of the input will then fall in the following 31 pel positions of the output. All other pel positions of the output are set to zero. If pel zero of the input is shifted less than 32 positions as shown in FIG. 7A, then the following pels fall in contiguous positions of the output from the end around shifter and will be written correctly into the strip buffer by setting the address for Section A equal to the address for Section B. If pel zero of the input is shifted 32 or more positions, but less than 64 positions, as shown in FIG. 7B, then instead of letting some of the following pels fall off the end of the end around shifter they are wrapped around the low order output pel positions as though positioned modulo 64. In this case, pels from the end around shifter are written correctly into the strip buffer by setting the address for Section A to one greater than the address for Section B. The lowest six bits of the starting pel parameter specify the output pel position into which pel zero of the input is placed. The presence of a bit in position with a weight of 32 in the starting pel parameter specifies that the address for section A is one greater than the address for section B. Whenever data is written in to the strip buffer, the contents of the strip buffer in that position are read out and locically ORed by ORs 46, 48 with the new data before being written back into the strip buffer. This process is required to avoid destroying patterns previously positioned within the span of the eight bytes accessed in the strip buffer, and also gives the automatic overstrike capability for characters such as 59 in FIG. 3 and the kerning function for characters such as 49 in FIG. 3.

The data from the strip buffer goes to parallel to serial converter 69 where it is converted to a serial bit stream on line 71. By means of switching means 82 and 84, the serial bit stream can be directed either on line 89 to control the imaging apparatus 32 for printing or to accumulator means 90 for temporary storage.

Accumulator means 90 comprises any suitable memory having the capacity to store a full bit image of a page so that a page of unlimited complexity can be printed. In the preferred embodiment, accumulator means 90 is a monolithic memory. As shown by the chart below, the data can be written into the accumulator through OR circuit 86 by placing switch 82 in position a and switch 84 in position b. Additional data can be ORed into the accumulator means by placing both switches 82, 84 in position a. To OR, by means of OR circuit 88, the accumulator data with new data on line 71 and print, switch 82 is placed in position b and switch 84 is in position c. When both switches are in position b, the data from line 71 is directed to output line 89 and the accumulator means is not used.

| Modes | Switch 82 | Switch 84 | Operation |
|-------|-----------|-----------|-----------|
| I     | a         | b         | Write Data into Accumulator |
| II    | a         | a         | OR additional Data into Accumulator |
| III   | b         | c         | OR Accumulator Data With New Data and Print |
| IV    | b         | c         | Accumulator not used |

The pattern move control 44 causes the proper number of scans for a pattern to be moved from the raster pattern memory through the pattern shifter to get them properly positioned along the scan line and placed into the strip buffer under control of control circuits 98 as will be discussed below. The pattern move control is concerned with the three hardware data types. In the first type, each 32-bit word of the RPM holds one scan line of a 32 pel pattern. The scan lines are taken one at a time and passed directly to the pattern shifter by activating gate 1 in FIG. 14. The RPM address 14 is incremented as each scan line of the pattern is handled. In the second data type, each word of the RPM holds two scan lines of a 16-pel character. The first 16 pels are passed to the shifter left justified by activating gate 2 in FIG. 14 and the remaining pels to the shifter input are set to zero by activating gate 6 in FIG. 14. After these pels have been written into the strip buffer, the pattern move control takes the second 16 pels in the RPM word, left justifies them by activating gate 3 in FIG. 14, blanks the remaining input pels by activating gate 6 in FIG. 14 and writes these into the next scan line in the strip buffer. The RPM address is incremented as each pair of scan lines in the pattern is handled. In the third data type, each word of the RPM holds two scans of the subarray for low resolution raster image data. The first 16 pels are handled first. Each pel is doubled which expands this data to the full 32-pel width of the pattern shifter input by activating gate 4 in FIG. 14. These 32 pels are then written twice into the strip buffer on sequential scan lines. Having completed the size doubling of the first halfword from the RPM, the pattern moved control performs the same operation on the second halfword while activating gate 5 in FIG. 14. The RPM address is incremented as each pair of scan lines of low resolution pattern is handled. The pattern move control adjusts the offset in the pattern shifter to properly position the scan line of the pattern with respect to the word structure of the strip buffer. The pattern move control selects the proper word along the scan line in the strip buffer for placing the output of the shifter. When necessary, it causes the address in the two sections of the strip buffer to be offset from each other. The pattern move control increments the scan position in the strip buffer as each scan is placed into it. It also decrements the scan counter as each scan line is transferred to the strip buffer and terminates the pattern transfer when the scan count equals zero. The pattern move control also handles the movement of data from the strip buffer to the imaging apparatus.

In the embodiment shown, the pattern move control 44 comprises a number of registers and data is loaded into each of these registers by the microprocessor as a preparatory step in each character move operation. The starting scan is loaded into register 91 from the scan table. The pattern address table supplies the data for starting pel for register 92, scans per for register 93, pels per for register 94, some data for the mode control register 95 and the RPM address for register 96. The mode control provides the control signal to actuate double dot control 97 (see FIG. 14) if required. Control circuits 98 comprise conventional gating circuits which may comprise AND, OR and LATCH circuits to control the data movement described above and these circuits are defined by the decision table shown in FIG. 15.

The decision table in FIG. 15 uses conventional notation for decision table such as the notation described in the book "Decision Tables" by Keith R. London, published by Auerback Publishers, Inc., New York, 1972, for example. The labels C1 to C5 denote the various conditions that are important to the pattern move control. This section of the chart is called the condition stub. The labels A1 to A14 denote the possible actions that can be taken by the pattern move control. This portion of the chart is called the action stub.

The upper section to the right of the vertical line is called the condition entry, and lists all the different states the conditions can take. The lower section to the right of the vertical line is called the action entry and shows the actions to be performed when a particular set of conditions exists. The combination of an explicit condition state and its associated actions is referred to as a rule.

Figure 14:
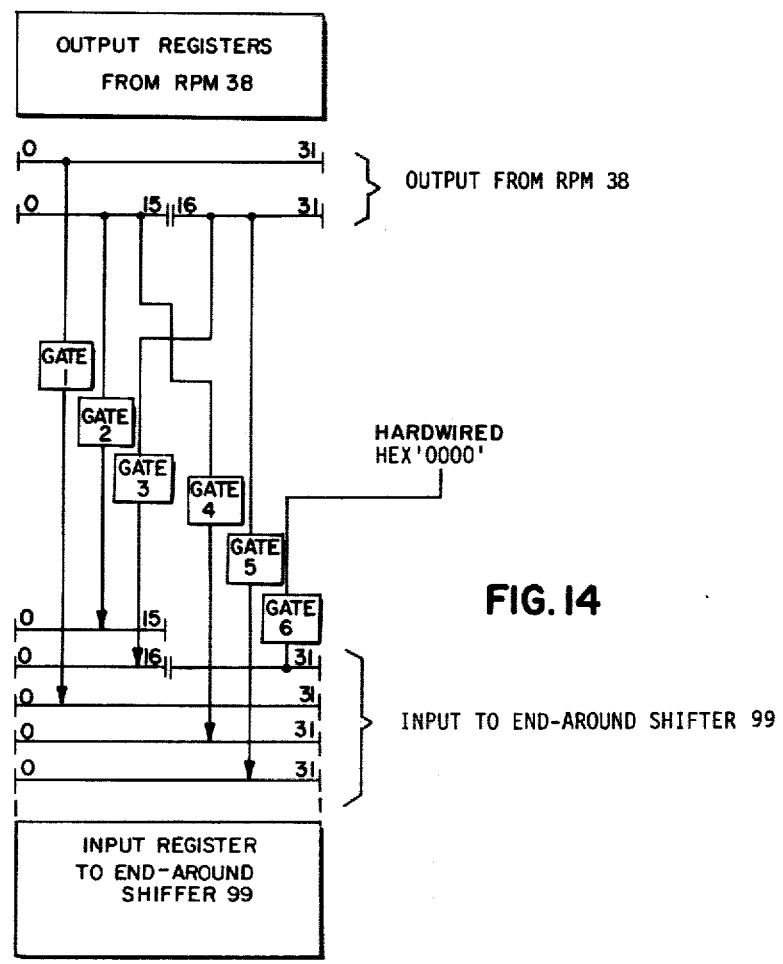
FIG. 14 shows the data path gating for double dot control 97.

In the action entry portion of the table, the Xs indicate the action that should be performed. The numbers specify which gate in FIG. 14 is to be activated. The following notation is used in the condition entry portion of the table. When a condition can take on only two values, the active state is represented by a "1", and the inactive state by a "0". A "don't care" situation is represented by a dash. The status counter can have 16 possible values which are represented by the hexadecimal notation 0-9, A-F. As an example: if the synch bit is present, the status count is equal to 2, and the mode bits call for a character 16 bits wide, but the mode does not call for double dotting; then the pattern move control increments the strip buffer scan, decrements the scan count, and increments the status counter.

The raster image of the page is generated in the 128 scan line range of the strip buffer at the same time the page is being printed. This dynamic process dictates that all the raster patterns that start on the same scan line must be placed in the strip buffer before moving on to the raster patterns that start on the next scan line. This means that as the page is printed, the raster patterns must be handled in starting scan line sequence. There is no guarantee that the data generated by the host application program will be in the sequence of ascending starting scan. In some cases the data from the host processor will be in order and, if so, a bit in the associated control information will indicate this to the printer. In this case, the printer does not process the data to put it in order, but merely prints the data in the sequence the data was transmitted over the channel. However, in most cases, the data will not be sorted in this order.

For example, in line 51 of the text in FIG. 3, the first character to be printed is the H. However, the sixth charater box 53 in the line represents a superscript character. Although this character is the sixth character in the line, it is printed second since it starts at a scan line prior to characters 55 which all start at the same scan line. Character box 57 represents a character having a subscript and consequently starts at a later scan line and smaller character boxes 61 also start at this scan line.

The printer provides an efficient and flexible means for assuring that raster patterns will be handled in starting scan line sequence when the page is being printed. Flexibility of the technique used makes it a matter of total indifference in which sequence the data arrives. This flexibility makes it possible for the printer to print data in two directions on a page and to shift the baseline at any time. The technique developed for the printer makes use of linked lists with one list for each scan line in the page. The collection of list heads is called a scan table. An example of the list for a scan line is shown threading through the pattern address table in FIG. 10. The list head for each scan line points to one of two places, it can point to the list head for the next scan line if there are no raster patterns to be printed starting on that scan line, or it can point to a table entry for the most recently received pattern to start on that scan line. There is a second table used in the printer sorting process. This table contains an entry for each character to be printed on a page, for each segment of a rule, and for each subarray of a raster image. This table is called that pattern address table. The scan table and pattern address table are built by the microprocessor at the time the page data are being received by the printer, as shown in FIGS. 16A through 16C, when organized as shown in FIG. 16. Examples showing the pattern address table entries for the page formats shown in FIGS. 9 and 11 are shown below:

The position of the character along the scan is defined by the starting pel, the size of the character is defined by the number of scans and by the pel count, and the address of the graphic character pattern is provided by the RPM address. During the printing of a page most of the fields in these table entries are moved by the microprocessor into the similarly named registers in the pattern move control 44 in FIG. 5.

In certain implementations it might be more efficient to include an additional scan line field for each character in the pattern address table and then to reorder this pattern address table into print sequence. Reordering could be achieved by a traditional arithmetic sort using the corresponding scan line fields or by associative memory using the scan line field as the search argument.

Pattern address table entries can also be prepared for other types of data to be printed such as the single pel and the double pel raster data. In addition, foreign language data such as Kanji can be processed in this manner. Entries are added at the end of the pattern address table as they are encountered in the input stream. Each entry contains all the information necessary to place the associated pattern in the proper place on the page, that is, starting location, size and address of the pattern. When a request for a pattern is encountered in the input data stream, the first task is to determine on which scan line it starts. The entry for it is then linked to the list head for that scan line. The entry is next linked to one of two places—it can point to the previous member of the list that contains all the raster patterns that start on the current scan line, or it can point to the list head for the next scan line, when this is the first entry to be encountered for the current scan line. The process of preparing the page for printing (see the flow chart of FIGS. 16A through 16C, when organized as shown in FIG. 16) consists of building the pattern address table, updating the scan table and loading into the raster pattern memory any new fonts and any image subarrays required for that page. The result of the page preparation process is linked lists that permit all the patterns on the page to be handled in starting scan line sequence. When printing begins, the scan table is searched, in sequence, for lists of patterns. The lists, which thread through the pattern address table, are taken a list at a time and their patterns are shifted into the correct position in the strip buffer.

It is also possible to think of these two tables as sets of instructions. The entries in the scan table can be thought of as branch instructions to either the next scan, or to an entry in the pattern address table. The pattern address table contains entries that can be treated as instructions to print a character. The pattern address table also contains branches to other of its entries, or to the next scan in the scan table.

The two tables of instructions are built and placed in the control store. The scan table has one entry for each scan line. All of the characters which are to begin on that scan line are linked into this entry. The manner in which the pattern address table is built is determined by the orientation of the printing. One example is shown in FIG. 8 for the "along scan line" printing in which text runs parallel to the scan line as shown in the page layout in FIG. 9.

First of all, the scan table is prepared which defines the characters which start at that particular scan line. Scan lines 0 and 1 are blank, and on scan line 2 there is a branch to address P+0. At address P+0 a proportional along (PAL) instruction is encountered. This instruction causes the printing of a letter A. The pel displacement along that scan line comes as a parameter of the instruction. The microprocessor then goes to the next sequential instruction at address P+1. This instruction causes the printing of the letter L. The operation is similar for the letters O, N and G. Next a branch (BR) instruction is encountered which returns to the next line in the scan table. This process is continued until the lines of text are printed. Generally, text data will require a large number of scan lines, but small numbers have been used here for ease of illustration.

The across scan line example in FIG. 10 begins in the same manner as the other example; however, at scan line 2, a branch to address P+10 is encountered, and this is an instruction to print the letter E from the word "example". The implicit branch links back to an instruction to print the letter S from the word "scan" and a further branch links back to an instruction to print the letter A from the word "across." The final implicit branch links back to the next scan line in the scan table. The ACROSS INSTRUCTION (AC) has a branch address field which provides the implicit branch.

Thus, it can be seen that by using this two-table structure, both orientations of text data can be combined upon the same page. As each character in a text stream is received, it is placed at the end of the pattern address table. Its scan line number is computed, and it is linked into the appropriate list. If this is "across" scan text, then linking involves a change to an address in the Scan Table and the addition of the implicit branch address. However, if this is "along" scan text, then only the initial character in each line requires a scan table modification, the intermediate characters are linked by their sequence in the Character Table, and the final character requires the additional branch instruction. Both orientations of text use essentially the same linking mechanism, and both can be done in the same scan and pattern address tables.

The microprocessor is intimately involved in the process of printing the page. The microprocessor loads the external registers that control the placement of each pattern on the page. Then, based on the parameters loaded into the control registers, the raster image generator hardward moves the pattern from the RPM into the strip buffer. The control registers specify the starting scan, the starting pel, the number of scans in the pattern and whether 16 or 32 pels per scan and, if 16 pels, whether size doubling is required, the RPM address where the pattern is stored and synchronization signals. The synchronization signals keep the pattern-moving hardware and the microprogram in step with each other. The last step performed by the microprocessor in the loading of the registers is to turn on a "ready to print" synchronization signal. Before the hardware starts to move the next pattern it checks the ready to print indicator to make sure all the parameters have been loaded. When the pattern move process is completed, the microprocessor is alerted to the fact that the pattern move control registers are ready for reloading. While the page is being printed, the microprocessor is also signaled after the printer completes each scan line. In this way the microprocessor keeps track of where the printer is in printing the page. The microprocessor can then force a pause in the character moving process, if necessary, to keep from overrunning the position of the printer. When a pause is initiated to prevent overrun, the pause is terminated when the signal indicates that the printer is far enough ahead to permit the pattern moving to resume. The microprocessor also controls the processes of loading print data into the raster image accumulator and the combining of print data already stored in the accumulator. Loading the accumulator is just like printing except that data goes to the accumulator instead of to the imaging apparatus using the options shown in FIG. 5.

The printer attaches to a System/370 channel. It is controlled by the host system through an extensive set of channel commands. There are four different types of channel commands which include write commands, load and delete commands, status commands and control commands. The write commands are provided for transferring data to the printer 12 from the data processing unit 16. The printer utilizes four write channel commands—two are for text printing and two are for imaging. A write text control command prepares the printer to receive anywhere from a few characters of text data up to an entire data set. Text data is transmitted by a succession of write text commands. Each write text command can transmit a block of text data and imbedded control codes.

A write image control command prepares the printer to receive one image rectangle. The image data is transmitted by a series of write image commands, which immediately follow the write image control. For either text or image, the control command orients the data on the page. Data is oriented using an XY coordinate system and, in the case of normal printing, such as this page, the origin of the XY coordinates would have been at the upper left hand corner of the logical page constructed by the channel commands.

Before the printer accepts a Write Text command, it must know the orientation of the text upon the printer page, the units in which movement along and between lines has been expressed and the characters that are used for making a blank space and escaping to a control sequence. These parameters are defined by the write text control channel command. This channel command transmits an eight-byte control record. The first two bytes establish text orientation, next four bytes establish the unit of measure and the final two bytes establish the two special character codes. The purpose of the two orientation bytes is to establish the line direction and the line sequence of the text to be provided with subsequent write text channel commands. The printer defines two combinations of line direction and line sequence. One of these is defined as upright and the other is defined as sideways. The first byte defines line direction and a line can be thought of as growing in the direction along which successive characters are added. This is called the line direction. The second byte determines the line sequence. A page of text can be thought of as growing in the direction in which successive lines of text are normally being added. This direction is called the line sequence. Line sequence is always orthogonal to line direction. Each of the two orientation bytes contains an encoding of one of the four directions +X, +Y, −X or −Y. These directions are represented by 0, 60, 120, and 180 and are encoded as Hex 00, Hex 3C, Hex 78 and Hex B4. Thus, for upright pages, such as the one you are now reading, the control bytes are Hex 00, Hex 3C for +X and +Y. In the case of the sideways page sample, the line direction is −Y and the line sequence is +X. In this case, the control bytes are Hex B4 and Hex 00. The user of the write text channel command is not concerned about X and Y. In the upright case, the line direction is +X, while in the sideways case it is −Y. Thus, by the setting of the first two bytes of the write text control channel command, the user establishes how the "as oriented for reading" text is to be printed by the printer with its X and Y coordinate system. The embedded controls of the write text command will be defined later. These embedded controls give text positioning information measured along the two directions defined in the control bytes described above. In the preferred embodiment of this printer, these directions are the customary directions on a page oriented for reading. The line direction is horizontal with new characters being added on the right. The line sequence is vertical with new lines being added successively lower down the page. Positioning information along the line direction is given in in-line units (I units). The purpose of the control bytes below is to define how many picture elements (pels) will constitute one I unit. A picture element is a single black or white dot. The printer prints at the rate of 240 pels per inch in both the X and Y direction. The in-line unit may be defined to be one pel or two pels or any number up to 255 pels. Byte three of the write text control channel command specifies the number of pels in an in-line unit in binary notation. Byte 5 specifies the number of pels in a baseline unit in binary notation. A text stream is made up of a sequence of eight-bit character codes. Two of the 256 possible character codes are reserved for special purposes. They cannot be used to print a character. One is the character code reserved for making a blank space (SP) and the other is the character code used to escape to a control sequence (ESC). In an EBCDIC text stream a Hex 40 is interpreted to be a blank space; however, other codes can be used as the space character in this printer, and this one-byte code is included in byte 6 of the channel command. Byte 7 includes the one-byte parameter that will cause an escape to a control sequence. The contents of byte 7 cannot be the same as the contents of byte 6. In the example shown in FIG. 11, the blank space code is Hex 40 and the escape character (ESC) is Hex 27.

Most current printers transfer a line of printing for each channel command used; however, the channel command in this printer will transfer whole blocks of text. The text can consist of any string of eight-bit characters. All Hex patterns, except those for SP and for ESC, are translated for printing by the font index table for the font currently selected by a control code. A control code is a sequence of two or more Hex bytes. The first byte is the escape character ESC which, in our example, is Hex 27. The second byte defines the particular control code.

There are several control codes that can be transmitted with text data by a write text command as an embedded control. These controls can be broken into three groups as follows: in-line codes which control the movement of characters along a text line; codes for controlling the movement of the baseline down the page; and miscellaneous codes.

The in-line control group includes codes which control in-line movement. In-line refers to movement in or along the line of text; thus, a space action is an in-line movement. In-line displacements are measured from the edge from which each successive character recedes. In the two orientations utilized by this printer, the in-line reference edge is the left edge of the page when the page is oriented for reading. The control Set In-Line Margin specifies the location of the left margin. This is a two-byte parameter and the first line of text and each new line following an End of Line control will start at the current left margin. This group of codes includes the following: the Set Letter Space is a control which alters the number of pels to be skipped after each printed character. The Set Blank Value control specifies the number of units to be skipped when a blank space character is found. The control Absolute Move In Line is used to move to a particular horizontal position in a line as measured from the left edge of the page. The Relative Move In Line (RMI) control is used to move to a new horizontal position in a line. The End-Of-Line control marks the end of a line of text. The printer presumes that the text which follows is to begin at the left margin on a new line.

The next group includes codes relating to baseline movement. The baseline is usually defined as the imaginary line upon which characters and words appear to rest. Thus, the letter s just rests upon the baseline, whereas the round part of the letter p appears to rest on the baseline while its descender projects below the baseline. Displacements in the baseline are measured from the edge of the paper from which successive lines of text ordinarily recede, that is, in the line sequence direction. This group of codes includes the following:- the Set Baseline Margin control specifies the location of the first baseline on the page. This control has a two-byte parameter which defines the location of the first line of text on each new page. The first line of text following an end page or write text control command will start on this baseline. The command Set Baseline Spacing determines the amount of space an end-of-line control causes to occur between printed lines. The Absolute Move Baseline control is used to move the baseline to a particular location as measured from the top edge of the page. The Relative Move Baseline control is used to move the baseline a specified distance from the current baseline location. These values move the baseline up or down the page. The Temporary Move Baseline is a control which causes a temporary shift up or down of the baseline on which the following characters are to be printed.

The final group of the embedded control codes includes facilities for drawing rules, and selecting fonts. Rules are horizontal or vertical lines of any height or width. They are useful, for example, in formatting tables with columns of numbers separated by heavy lines.

Figure 12:
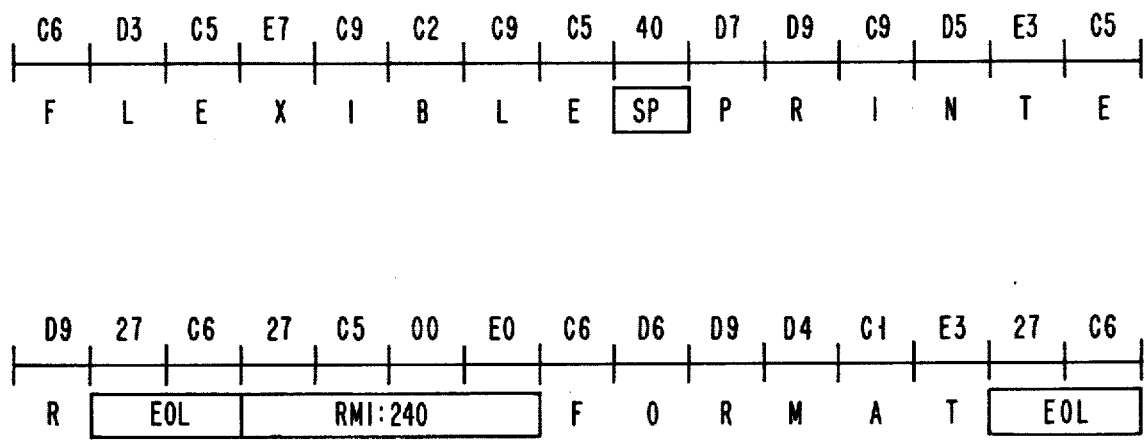
FIG. 12 is a diagram showing an example of the use of text data along with embedded control data.

As an example of the usage of the text data with embedded control codes, refer to FIG. 12. The text stream consists of the EBCDIC encoding for the word "FLEXIBLE" followed by the standard space code of Hex 40 followed by an encoding of the word "PRINTER" followed by the escape character Hex 27. The two-byte control code Hex 27C6 represents the end of line embedded control. While it marks the end of printed line, the text stream continues with data for the next line. Immediately following is a Hex 27C500E0.

The two bytes Hex 27C5 indicate that the first character on the next line is to be indented some distance from the current left margin. The Hex number 00F0, which converts to 240 in decimal, indicates that the indention is to be of 240 pels, that is, one inch. The data stream continues to the end of the second line. Below it appears the two sample lines as they would be printed. The example would look better if the word "FORMAT" were centered under the phrase "FLEXIBLE PRINTER." Changing the RMI parameter from 240 to 160, that is, from Hex 00E0 to Hex 00A0, would result in a displacement from the margin of only two-thirds of an inch instead of the one inch shown in the figure. When this corrected data stream is printed, it will have the word "FORMAT" centered under the words "FLEXIBLE PRINTER."

A font is a collection of character patterns from which characters to be printed are selected. A 96-character font might consist of 26 upper case letters, 26 lower case letters, 10 digits and 34 special symbols including all the punctuation marks. Each font normally consists of one size, style and weight of character and has a traditional name, such as 14 POINT (size) Press Roman (style) and bold (weight).

The printer is designed to print images as well as text data. The images may be scanned or computer generated in various ways; however, they are transmitted to the printer as binary bit image data, that is, as black and white dots in scan line sequence. Image control information is contained in a 30-byte image control record which is transmitted to the printer by the write image control channel command. The image itself, which may require dozens of 2,048 byte data tranmissions, is transmitted by subsequent write image commands.

The write image data received by the printer is interpreted to be a sequence of compressed or uncompressed scan lines. It is assumed that each scan line will be equal in uncompressed length. The sequence of scan lines, when taken together, are assumed to form an image rectangle. The first dimension of the rectangle is measured in pels; the second dimension is measured in scan lines. The first two bytes provide a scan line length as a count of the number of pels in a scan line, and this information is written as a binary number. Scan lines which are transmitted uncompressed by a write image channel command are required to be an even number of double bytes long, that is, the binary coded pel count must end with Hex 0. Bytes 2 and 3 define the image rectangle width as a count of the number of scan lines in the image defined as a binary number. Byte 5 is the decompression selector. A code of Hex 00 defines no compression in the image data, whereas the code of Hex 01 selects the printer decompression feature algorithm. Scanner products are devices which create a digital electronic image of whatever their electronic eye scans. A full 8½ by 11 inch page encoded as black and white dots has a 673,200 byte electronic image. To reduce this number, some scanner products offer electronic image compression. Compressed images can often be represented with a fraction of the original data. Smaller data size reduces the host system data storage and data transmission requirements. Storage and transmission economics are the primary reason for image compression and decompression. There is much white space on most of the pages people read. When an ordinary sheet is scanned, long strings of white dots are encoded. Many bits can be saved by a compression scheme that represents a long scan line of white dots by a special white dot code and a count of the number of dots. This scheme, run length coding, is only one of many such schemes that could be used.

Trim. Input images can be trimmed to make a smaller rectangle for printing. Bytes 6 and 7 define as counts coded in binary the starting pel trim count which defines the number of pels to be deleted from the beginning of each scan line, whereas bytes 8 and 9 define in binary code the ending pel trim count which defines the number of pels to be deleted from the end of each scan line. Bytes 10 and 11 are utilized as starting scan trim count for image data, whereas bytes 12 and 13 define the ending scan trim count for image data. The pel count scale factor is included in byte 14. On each square inch of paper the printer hardware prints 240 scan lines with 240 bits of data in each scan line; that is, 57,600 bits of data per square inch. Some applications do not require or cannot afford such high resolution. For these applications, the printer provides a low resolution image with only one-quarter the number of bits per square inch; that is, 120 scan lines and 120 bits per scan line for each square inch. The actual printing hardware still prints 240 pels. It implements the 120 pel case by repeating each low resolution data bit twice. Similarly, each scan line which has just had its data bits doubled, is itself printed two times. The two scale factors can be used to specify that an image is to be printed as is, or is to be enlarged in scale. Byte 14 can be coded Hex 01 for no scaling, or Hex 02 to double the number of pels. This makes each scan line twice as long as it would have been without the scale factor of 2.

While the invention has been particularly shown and described with reference to preferred embodiments thereof, it will be understood by those skilled in the art that various changes in the form and details may be made therein without departing from the spirit and scope of the invention.

Having thus described our invention, what we claim as new, and desire to secure by Letters Patent is:

1. A system for printing text and image data in raster form on a print medium in response to input data, said system comprising:

means for providing input data comprising character data and control data including position data and font data in the form of successively occurring groups of data of like size;

storage means for storing in response to said font data graphic coded data comprising a plurality of bits in discrete groups for each of the characters represented by said character data;

first control means coupled to said means for providing input data to receive said input character data and for processing said input character data in response to said control data, said first control means operable in response to said control data to translate each group of character data into a group of translated data comprising position data specifying the position of the character on the page to be printed, size data defining the size of the graphic character defined by the character data, and address data to define the position in said storage means of the graphic coded data which defines the character represented by the group of character data; said first control means operable to generate a first control signal indicative that all character data to be printed on a page has been translated;

buffer means coupled to receive graphic coded data from said storage means and for assembling the graphic coded data for a part of the page to be printed;

second control means coupled to said first control means, said buffer means and said storage means, said second control means being responsive to said first control signal and to said position data, said size data and said address data for sequentially moving from said storage means to said buffer means graphic coded data comprising all discrete groups for the specified translated data in the sequence the data is to be printed;

means for logically combining said graphic coded data from said storage means with the assemblage of graphic coded data previously stored in said buffer means as said graphic coded data is moved from said storage means to said buffer means; and third control means coupled to said buffer means for accessing said logically combined assemblage of graphic coded data stored in one area of the buffer means for sequentially printing on a print medium each of the characters represented by the character data.

2. The system of claim 1 additionally comprising:

said first control means operable to generate a second control signal in response to a first sensed condition and said second control means operable to generate a third control signal in response to a second sensed condition;

accumulator means coupled to said buffer means for receiving graphic coded data and for storing an assemblage of graphic coded data;

switching means coupled to selectively transfer graphic coded data from said buffer means, said switching means being operable in response to said second control signal or said third control signal for transferring successive groups of assembled graphic coded data out of the buffer means to the accumulator means for temporary storage of said data;

means for logically combining said assembled graphic coded data previously stored in said accumulator means in synchronism with subsequent graphic coded data to be printed at a corresponding place on the print medium; and means for activating said third control means for printing on the print medium the logically combined assemblage of graphic coded data.

3. The system according to claim 1 wherein said means for sequentially printing on a print medium comprises imaging apparatus including means for repetitively recording in successive scans, each such scan being displaced from the immediately preceding scan line along the length of the medium.

4. The system according to claim 3 wherein said first control means is operable to group said translated data into scan data defining the position of the character on the page to be printed.

5. The system according to claim 4 wherein said means for generating scan data defining the position of the character on the page to be printed comprises means for arranging all discrete groups of graphic coded data which start on the same scan line into a linked list and preparing a list for each scan line.

6. The system according to claim 1 wherein said buffer means comprises a word organized memory and pattern shifter means coupled to said word organized memory for positioning discrete groups of graphic coded data in said buffer means aligned with respect to the word structure of the buffer means.

7. The system according to claim 6 wherein said pattern shifter means comprises an end around shifter, said buffer means comprising two separately addressable sections, and addressing means for addressing the same address in each of said separately addressable sections in said buffer means when there is no end around carry in positioning said groups of graphic coded data and addressing the next successive address for one of said separately addressable sections when there is an end around carry in positioning the groups of graphic coded data.

8. The system according to claim 2 wherein said means for sequentially printing on a print medium comprises imaging apparatus including means for repetitively recording in successive scans, each such scan being displaced from the immediately preceding scan line along the length of the medium.

9. The system according to claim 8 wherein said first control means is operable to group said translated data into scan data defining the position of the character on the page to be printed.

10. The system according to claim 9 wherein said means for generating scan data defining the position of the character on the page to be printed comprises means for arranging all discrete groups of graphic coded data which start on the same scan line into a linked list and preparing a list for each scan line.

11. The system according to claim 2 wherein said buffer means comprises a word organized memory and pattern shifter means coupled to said word organized memory for positioning discrete groups of graphic coded data in said buffer means aligned with respect to the word structure of the buffer means.

12. The system according to claim 11 wherein said pattern shifter means comprises an end around shifter, said buffer means comprising two separately addressable sections, and addressing means for addressing the same address in each of said separately addressable sections in said buffer means when there is no end around carry in positioning said group of graphic coded data and addressing the next successive address for one of said separately addressable sections when there is an end around carry in positioning the group of graphic coded data.

13. A system for printing text and image data in raster form on a print medium in response to input data, said system comprising:

means for providing input data including first groups and predetermined control groups in the form of successively occurring groups of data of like size;

storage means for storing graphic coded data comprising a plurality of bits in discrete groups for each of the characters represented by said first groups of input data;

first control means coupled to said means for providing input data to receive said input character data and for processing said input groups of data sequentially, said first control means operable in response to one of said predetermined control group of input data to translate first groups of said input data into a group of translated data comprising position data specifying the position of the character on the page to be printed, size data defining the size of the graphic character defined by the first group of data and address data to define the position in said storage means of the graphic coded data which defines the character represented by the first groups of input character data, said first control means also operable responsive to a predetermined group of said input data to process the following group of data as control information, said first control means operable to generate a first control signal indicative that all character data to be printed on a page has been translated;

buffer means coupled to receive graphic coded data from said storage means and for assembling the graphic coded data for a part of the page to be printed;

second control means coupled to said first control means, said buffer means, and said storage means, said second control means being responsive to said first control signal and to control information, said position data, said size data and said address data for sequentially moving from said storage means to said buffer means graphic coded data comprising all discrete groups for the specified translated data in the sequence and format the data is to be printed;

means for logically combining said graphic coded data from said storage means with the assemblage of graphic coded data previously stored in said buffer means as said graphic coded data is moved from said storage means to said buffer means; and third control means coupled to said buffer means for accessing said logically combined assemblage of graphic coded data stored in one area of the buffer means for sequentially printing on a print medium of each of the characters represented by the character data.

14. The system of claim 13 additionally comprising:
said first control means being operable to generate a second control signal in response to a first sensed condition and said second control means being operable to generate a third control signal in response to a second sensed condition;

accumulator means coupled to said buffer means for receiving graphic coded data and for storing an assemblage of graphic coded data;

switching means coupled to selectively transfer graphic coded data from said buffer means; said switching means being operable in response to said second control signal or said third control signal for transferring successive groups of graphic coded data out of the buffer means to the accumulator means for temporary storage of said data;

means for logically combining said assembled graphic coded data previously stored in said accumulator means in synchronism with subsequent graphic coded data to be printed at a corresponding place on the print medium; and means for activating said third control means for printing on the print medium the logically combined assemblage of graphic coded data.

15. The system according to claim 13 wherein said means for sequentially printing on a print medium comprises imaging apparatus including means for repetitively recording in successive scans, each such scan being displaced from the immediately preceding scan line along the length of the medium.

16. The system according to claim 15 wherein said first control means is operable to group said translated data into scan data defining the position of the character on the page to be printed.

17. The system according to claim 16 wherein said means for generating scan data defining the position of the character on the page to be printed comprises means for arranging all discrete groups of graphic coded data which start on the same scan line into a linked list and preparing a list for each scan line.

18. The system according to claim 13 wherein said buffer means comprises a word organized memory and pattern shifter means coupled to said word organized memory for positioning discrete groups of graphic coded data in said buffer means aligned with respect to the word structure of the buffer means.

19. The system according to claim 18 wherein said pattern shifter means comprises an end around shifter, said buffer means comprising two separately addressable sections, and addressing means for addressing the same address in each of said separately addressable sections in said buffer means when there is no end around carry and addressing the next successive address for one of said separately addressable sections when there is an end around carry in positioning the groups of graphic coded data.

20. The system of claim 14 wherein said second control means is also operable to arrange all graphic data for said part of the page to be printed into a linked list.

21. The system according to claim 20 wherein said buffer means comprises a word organized memory and pattern shifter means coupled to said word organized memory for positioning discrete groups of graphic coded data in said buffer means aligned with respect to the word structure of the buffer means.

22. The system according to claim 21 wherein said pattern shifter means comprises an end around shifter, said buffer means comprising two separately addressable sections, and addressing means for addressing the same address in each of said separately addressable sections in said buffer means when there is no end around carry in positioning said groups of graphic coded data and addressing the next successive address for one of said separately addressable sections when there is an end around carry in positioning said groups of graphic coded data.

* * * * *